US010282900B2

(12) United States Patent
Hattingh

(10) Patent No.: US 10,282,900 B2
(45) Date of Patent: *May 7, 2019

(54) SYSTEMS AND METHODS FOR PROJECTING PLANAR AND 3D IMAGES THROUGH WATER OR LIQUID ONTO A SURFACE

(71) Applicant: Pointcloud Media, LLC, Sugar Land, TX (US)

(72) Inventor: Jacobus G. Hattingh, Sugar Land, TX (US)

(73) Assignee: POINTCLOUD MEDIA, LLC, Sugar Land, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 15/868,376

(22) Filed: Jan. 11, 2018

(65) Prior Publication Data
US 2018/0197333 A1    Jul. 12, 2018

Related U.S. Application Data

(63) Continuation of application No. 14/935,594, filed on Nov. 9, 2015, now Pat. No. 9,898,861.

(60) Provisional application No. 62/083,843, filed on Nov. 24, 2014.

(51) Int. Cl.
G06T 19/00    (2011.01)
G09G 3/00     (2006.01)

(52) U.S. Cl.
CPC ............ G06T 19/00 (2013.01); G09G 3/003 (2013.01)

(58) Field of Classification Search
None
See application file for complete search history.

(56) References Cited

U.S. PATENT DOCUMENTS

| 6,011,562 | A  | 1/2000 | Gagne et al. |
| 6,538,654 | B1 | 3/2003 | Rose et al. |
| 6,563,504 | B1 | 5/2003 | Rose et al. |
| 6,686,918 | B1 | 2/2004 | Cajolet et al. |
| 7,007,295 | B1 | 2/2006 | Rose et al. |

(Continued)

OTHER PUBLICATIONS

Popular Science; "Cinerama", 7 pages, Aug. 1950; http://www.widescreenmuseum.com/widescreen/popscience.htm; The American WideScreen Museum; no month; 1999; US.

(Continued)

Primary Examiner — Andrew G Yang
(74) Attorney, Agent, or Firm — Jeffrey L. Wendt; The Wendt Firm, P.C.

(57) ABSTRACT

Systems and methods for projecting planar and 3D images through water or liquid onto a surface include creating a 3D model of the body of liquid and surface and 3D models of creative elements to be used in scenes. Animating the 3D models of the creative elements, placing them inside the 3D model of the body of liquid. Lighting the animated creative elements, rendering planar animations of the modeled creative elements and, using projection and texturing software, virtually projecting the planar animations back onto the surface of the 3D model of the body of liquid from the same camera position in order to "bake in" a warped transformation of the digitally rendered planar animations. Digitally rendering a 3D animation of the warped, transformed planar animations, and playing or looping the digitally rendered 3D animation through the body of liquid on a digital video player or digital server.

24 Claims, 8 Drawing Sheets

(56) References Cited

U.S. PATENT DOCUMENTS

| | | |
|---|---|---|
| 7,336,264 B2 | 2/2008 | Cajolet et al. |
| 7,364,310 B2 | 4/2008 | Yamazaki |
| 8,401,284 B2 | 5/2008 | Pettigrew et al. |
| 7,656,402 B2 | 2/2010 | Abraham et al. |
| 7,791,608 B2 | 9/2010 | Henson et al. |
| 7,940,268 B2 | 5/2011 | Zhou et al. |
| 7,940,269 B2 | 5/2011 | Zhou et al. |
| 7,967,445 B2 | 6/2011 | Hamano et al. |
| 8,054,311 B1 | 8/2011 | Sheffler et al. |
| 8,167,695 B2 | 5/2012 | Rowe |
| 8,176,124 B2 | 5/2012 | Graham |
| 8,184,906 B2 | 5/2012 | Chaffey |
| 8,257,157 B2 | 9/2012 | Polchin |
| 8,269,778 B1 | 9/2012 | Baraff et al. |
| 8,305,378 B2 | 11/2012 | Borac |
| 8,317,606 B2 | 11/2012 | Graham et al. |
| 8,325,178 B1 | 12/2012 | Ressing et al. |
| 8,339,402 B2 | 12/2012 | Henson et al. |
| 8,352,060 B2 | 1/2013 | Chun et al. |
| 8,358,310 B2 | 1/2013 | Miller et al. |
| 8,364,561 B2 | 1/2013 | Wolper et al. |
| 8,379,028 B1 | 2/2013 | Mullins |
| 8,387,099 B2 | 2/2013 | Perlman |
| 8,400,455 B2 | 3/2013 | Gregory et al. |
| 8,428,326 B2 | 4/2013 | Falk et al. |
| 8,439,503 B2 | 5/2013 | Reichow |
| 8,442,764 B2 | 5/2013 | Schulze et al. |
| 8,468,575 B2 | 6/2013 | Perlman et al. |
| 8,471,844 B2 | 6/2013 | Davidson et al. |
| 8,485,893 B2 | 7/2013 | Rowe |
| 8,522,201 B2 | 8/2013 | Elmieh et al. |
| 8,564,644 B2 | 10/2013 | Engle et al. |
| 8,576,225 B2 | 11/2013 | Garg et al. |
| 8,576,228 B2 | 11/2013 | Davidson et al. |
| 8,599,197 B1 | 12/2013 | Yu et al. |
| 8,606,942 B2 | 12/2013 | Perlman et al. |
| 8,633,933 B2 | 1/2014 | Henson et al. |
| 8,654,121 B1 | 2/2014 | Yu et al. |
| 8,665,258 B2 | 3/2014 | Diverdi et al. |
| 8,665,261 B1 | 3/2014 | Baraff et al. |
| 8,669,980 B1 | 3/2014 | Quaroni et al. |
| 8,674,988 B2 | 3/2014 | Tamstorf et al. |
| 8,681,147 B1 | 3/2014 | Baraff et al. |
| 8,698,810 B2 | 4/2014 | Witkin et al. |
| 8,704,823 B1 | 4/2014 | Waggoner et al. |
| 8,711,141 B2 | 4/2014 | Xie et al. |
| 8,711,923 B2 | 4/2014 | Perlman et al. |
| 8,743,126 B2 | 6/2014 | Lanciault et al. |
| 8,786,611 B1 | 7/2014 | Comet et al. |
| 8,810,590 B2 | 8/2014 | Oat et al. |
| 8,817,013 B2 | 8/2014 | Meischner |
| 8,823,711 B2 | 9/2014 | Mital et al. |
| 8,832,772 B2 | 9/2014 | Perlman et al. |
| 8,847,963 B1 | 9/2014 | Comet et al. |
| 8,860,734 B2 | 10/2014 | Sieka |
| 8,881,215 B2 | 11/2014 | Perlman |
| 8,893,207 B2 | 11/2014 | Perlman et al. |
| 9,787,958 B2 | 10/2017 | Hattingh et al. |
| 9,898,861 B2 | 2/2018 | Hattingh |
| 2004/0100482 A1 | 5/2004 | Cajolet et al. |
| 2005/0088434 A1 | 4/2005 | Potucek |
| 2006/0067163 A1 | 3/2006 | McEwen |
| 2006/0092154 A1 | 5/2006 | Lee |
| 2008/0246974 A1 | 10/2008 | Wilson |
| 2012/0038628 A1 | 2/2012 | Corazza et al. |
| 2013/0050185 A1 | 2/2013 | Xie et al. |
| 2013/0215012 A1 | 8/2013 | Reddy |
| 2013/0257851 A1 | 10/2013 | Lee et al. |
| 2015/0116321 A1 | 4/2015 | Fortner |

OTHER PUBLICATIONS

Wikipedia; "Cinerama", 12 pages; Jul. 4, 2014; http://en.wikipedia.org/wiki/Cinerama; The Wikimedia Foundation, Inc; US.

Moltenbrey; "A Deal with the Devil"; 6 pages; Computer Graphics World, Apr. 7, 2014; http://www.cgw.com/Press-Center/In-Focus/2014/A-Deal-with-the-Devil.aspx; US.

Ellingson; "CinemaCon 2014: Barco pulls back curtain on surround cinema experience", 5 pages; L.A. Biz, downloaded from the Internet Sep. 2, 2014 at url http://www.bizjournals.com/news/2014/04/01/cinemacon-2014-barco-pulls-back-curtain-on.html?page=all, on Sep. 2, 2014; Bizjournals; US.

McCormick; "270-degree ScreenX technology shows ultra-wide movies on three walls", 2 pages; The Verge, Oct. 18, 2013; The Verge.com; US.

Cohen; "CinemaCon: Barco Unveils 'Wraparound' Screen System", 6 pages; Variety.com, Mar. 24, 2014, access via the Internet at url http://variety.com/2014/films/news/cinemacon-barco-unviels-wraparound-screen-system-1201145427/, on Sep. 2, 2014; Variety Media, LLC; US.

Warren; "Microsoft's mind-blowing IllumiRoom Xbox projector costs too much to release", 2 pages; The Verge; Sep. 2, 2013; The Verge.com; US.

Digital Signage Today; "Projection mapping digital signage goes for a swim"; 2 pages; Digital Signage Today; Mar. 5, 2014; http://www.digitalsignagetoday.com/news/projection-mapping-digital-signage-goes-for-a-swim/; Networld Media Group, LLC; US.

Hattingh, J.; "First ever Raylight4D Pool projection Installation—Sheraton Wikiki Beach"; Aug. 18, 2014; Youtube video; https://youtu.be/WSrpQ0Cm-Q4.

Enright, et al., "Animation and Rendering of Complex Water Surfaces," Jul. 2002, Proceedings of ACM SIGGRAPH 2002, pp. 736-744.

Non-Final Office Action dated Jul. 28, 2017, U.S. Appl. No. 14/935,594, pp. 1-21.

SYSTEMS AND METHODS FOR PROJECTING PLANAR AND 3D IMAGES THROUGH WATER OR LIQUID ONTO A SURFACE

CROSS-REFERENCE TO RELATED APPLICATIONS

This application is continuation of U.S. non-provisional patent application Ser. No. 14/935,594, filed Nov. 9, 2015, now U.S. Pat. No. 9,898,861, issued Feb. 20, 2018, which claimed benefit of U.S. provisional patent application Ser. No. 62/083,843, filed Nov. 24, 2014, both of which are incorporated herein by reference in their entirety.

BACKGROUND INFORMATION

Technical Field

The present disclosure relates generally to the field of entertainment, and more specifically to methods and systems for transforming a swimming pool or other body of liquid into a dynamic entertainment venue using digital motion picture capture, rendering, and projection of creative elements in swimming pools and other liquid venues.

Background Art

Other than actual "pool parties" a swimming pool or pond is generally a dead space and hardly used during evenings and special or social events. Attempts to use this space are limited to floating objects or internal static lighting. There is currently no known system or method that enables a pool owner to have animated objects in the pool. The closest known competing system and method to my invention is a color changing light that cycles through a few colors; other than this the system is static and never changing. In essence, pool lights only illuminate the pool, and are static and never changing, aside from this simple color-changing effect. This is initially interesting but quickly becomes boring to users of the pool or pool area.

In U.S. Pat. No. 9,787,958, I and my co-inventor explained an advance in the cinematography art comprising methods, systems, and computer-readable media to retrofit existing theatre and other venues so that viewers may enjoy the benefits of increased perspective, 3D viewing of entertaining, educational, or business content. We explained that no one had disclosed or taught how an animation or footage, originated or captured in 2D, 3D, or otherwise, may be processed to bake it into a forced perspective planar image and projected in planar format onto a tri-planar, tri-surface arrangement.

In the context of swimming pools and other bodies of liquid, it would also be an advance in the entertainment art to project more than simple light, or light of varying color, into a pool to make the pool the centerpiece of an event, amaze audiences and guests as well as generate additional revenue stream to resorts, hotels, pool complexes, aquatic centers and any place with ponds, pools, dams or liquid containers. The present invention is directed to solving this problem.

SUMMARY

In accordance with the present disclosure, methods, systems, computer-readable media, and kits are described which reduce or overcome one or more of the above problems, and make the pool the centerpiece of an event, amaze audiences and guests as well as generate additional revenue stream to resorts, hotels, pool complexes, aquatic centers and any place with a ponds, pools, dams or liquid containers. My invention can be updated at anytime to match a theme or an event. It brings the pool or pond alive with images such as living creatures, coral and plant life, logos and characters in 3D and in full color. My invention changes the pool into a total new 3D ecosystem or a fantasy world and the 3D content can be updated and changed at anytime.

A first aspect of the disclosure is a method comprising:

a) selecting a body of liquid for projecting images through, the body of liquid contained within a surface defining a resort swimming pool or a hotel swimming pool;

b) gathering measurements of the body of liquid and the surface defining the resort swimming pool or the hotel swimming pool;

c) creating a digital virtual 3D model of the body of liquid and the surface defining the resort swimming pool or the hotel swimming pool by loading the measurements into a memory of a digital computer, the computer including at least one processor programmed by computer software sufficient to create virtual 3D images of the body of liquid and the surface defining the resort swimming pool or the hotel swimming pool;

d) creating digital virtual 3D models of creative elements to be used in one or more scenes using the at least one processor programmed by computer software sufficient to create the digital virtual 3D models of the creative elements;

e) digitally animating the digital virtual 3D models of the creative elements using the at least one processor programmed by computer software sufficient to digitally animate the digital virtual 3D models of the creative elements;

f) placing the digitally animated digital virtual 3D modeled creative elements inside the digital virtual 3D model of the body of liquid using the at least one processor programmed by computer software sufficient to place the digitally animated digital virtual 3D modeled creative elements inside the digital virtual 3D model of the body of liquid, using the digital virtual 3D model of the body of liquid and surface to virtually place the digitally animated digital virtual 3D modeled creative elements inside the digital virtual 3D model of the body of liquid and cast shadows onto the digital virtual 3D model of the surface defining the resort swimming pool or the hotel swimming pool;

g) lighting the animated digital virtual 3D modeled creative elements using the at least one processor programmed with one or more virtual 3D lighting programs to create the cast shadows;

h) creating digitally rendered planar animations of the lighted, animated digital virtual 3D modeled creative elements using the at least one processor programmed by digital rendering software;

i) using the at least one processor programmed by digital projection software, virtually projecting the digitally rendered planar animations back onto the digital virtual 3D model of the surface defining the resort swimming pool or the hotel swimming pool of an empty digital virtual 3D model of the body of liquid from the same virtual camera position as in the previous step, thereby electronically baking forced perspective images of the digitally rendered planar animations onto the digital virtual 3D model of the surface defining the resort swimming pool or the hotel swimming pool; and j) using the at least one processor programmed by digital rendering software, digitally rendering a 3D animation of the electronically baked forced perspective images of the digitally rendered planar animations from a virtual position that is at the same angle and position as a planned angle and location of a digital physical projector to be installed at a site of the body of liquid.

A second aspect of the disclosure is a method comprising:

a) selecting a resort swimming pool or hotel swimming pool for projecting images through, the resort swimming pool or the hotel swimming pool contained within a surface defining the resort swimming pool or the hotel swimming pool;

b) gathering exact measurements of an outer rim as well as the inside surface area of the resort swimming pool or the hotel swimming pool by hand or from CAD drawings, blueprints or a laser scanner;

c) creating a digital virtual 3D model of the resort swimming pool or the hotel swimming pool and the surface defining the resort swimming pool or the hotel swimming pool by loading the measurements into a memory of a digital computer, the computer including at least one processor programmed by computer software sufficient to make the digital virtual 3D images of the resort swimming pool or the hotel swimming pool contained within the surface defining the resort swimming pool or the hotel swimming pool;

d) creating digital virtual 3D models of creative elements to be used in one or more scenes using the digital computer and the computer software;

e) animating the digital virtual 3D models making sure that moveable creative elements (for example, human characters and non-human creatures) travel within the digital virtual 3D model of the resort swimming pool or the hotel swimming pool contained within a surface defining the resort swimming pool or the hotel swimming pool;

f) placing the animated digital virtual 3D modeled creative elements inside the digital virtual 3D model of the resort swimming pool or the hotel swimming pool using the digital virtual 3D model of the resort swimming pool or the hotel swimming pool and the surface defining the resort swimming pool or the hotel swimming pool to virtually place the digitally animated digital virtual 3D modeled creative elements inside the digital virtual 3D model of the resort swimming pool or the hotel swimming pool and cast shadows onto the digital virtual 3D model of the surface defining the resort swimming pool or the hotel swimming pool;

g) lighting the animated digital virtual 3D modeled creative elements using the programmed digital computer programmed with one or more digital virtual 3D lighting programs in such a way to cast the shadows of the animated digital virtual 3D modeled creative elements on the digital virtual 3D model of the surface defining the resort swimming pool or the hotel swimming pool, causing enhanced 3D augmentation in the resort swimming pool or the hotel swimming pool when the animation is played therein;

h) creating digital rendered planar animations of the lighted, animated digital virtual 3D modeled creative elements and/or stills by:

A) rendering the lighted, animated digital virtual 3D modeled creative elements and/or stills from a virtual camera directly above the virtual resort swimming pool or the hotel swimming pool in the 3D virtual model if the resort swimming pool or the hotel swimming pool and the surface defining the resort swimming pool or the hotel swimming pool are located in the center of a viewing area; or B) rendering the lighted, animated digital virtual 3D modeled creative elements and/or stills from a virtual camera located at a center of a side vantage point in the 3D virtual model if the resort swimming pool or the hotel swimming pool and surface defining the resort swimming pool or the hotel swimming pool are to be viewed from one side only;

i) using the programmed digital computer, virtually projecting the digital rendered planar animations back onto the digital virtual 3D model of the surface defining the resort swimming pool or the hotel swimming pool of an empty digital virtual 3D model of the resort swimming pool or the hotel swimming pool from the same virtual camera position as in the previous step, thereby electronically baking forced perspective images of the digital rendered planar animations onto the digital virtual 3D model of the surface defining the resort swimming pool or the hotel swimming pool;

j) digitally rendering a 3D animation of the electronically baked forced perspective images of the digital rendered planar animations from a virtual position that is at the same angle and position as a planned angle and location of a digital physical projector to be installed at a site of the resort swimming pool or the hotel swimming pool; and k) at the site, installing the digital physical projector as planned on a structure above or to one side of the resort swimming pool or the hotel swimming pool in the same position as the virtual position, connecting the digital physical projector to a video player or server capable of playing digital and video images, loading the digitally rendering a 3D animation into the video player or server, waiting until the sun sets or reasonable darkness if the resort swimming pool or the hotel swimming pool is outdoors, focusing the digital physical projector and lining up the digital virtual 3D model of the resort swimming pool or the hotel swimming pool with the resort swimming pool or the hotel swimming pool while projecting the digital virtual 3D model of the resort swimming pool or the hotel swimming pool onto the surface defining the resort swimming pool or the hotel swimming pool and containing the resort swimming pool or the hotel swimming pool, and playing and/or looping the digitally rendering a 3D animation.

A third of the disclosure is a system comprising:

a) a digital computer, the digital computer including a memory and at least one processor programmed by computer software sufficient to make digital virtual 3D images of a resort swimming pool or the hotel swimming pool and a surface containing the resort swimming pool or the hotel swimming pool, b) the memory sufficient to hold measurements of the resort swimming pool or the hotel swimming pool and the surface defining the resort swimming pool or the hotel swimming pool, the at least one processor programmed by computer software sufficient to:

create digital virtual 3D models of creative elements;

animate the digital virtual 3D models of the creative elements;

place at least some of the animated digital virtual 3D modeled creative elements inside the digital virtual 3D image of the resort swimming pool or the hotel swimming pool using the digital virtual 3D images of the resort swimming pool or the hotel swimming pool and the surface defining the resort swimming pool or the hotel swimming pool to place the at least some of the animated digital virtual 3D modeled creative elements into the digital virtual 3D image of the resort swimming pool or the hotel swimming pool and cast shadows onto the digital virtual 3D image of the surface defining the resort swimming pool or the hotel swimming pool;

light at least some of the animated digital virtual 3D modeled creative elements with one or more virtual 3D lighting programs to create the cast shadows;

create digitally rendered planar animations of the lighted, animated digital virtual 3D modeled creative elements;

virtually project the digitally rendered planar animations back onto the digital virtual 3D image of the surface defining the resort swimming pool or the hotel swimming pool of an empty digital virtual 3D image of the resort swimming pool or the hotel swimming pool from the same virtual camera position as in the previous step, thereby electronically baking forced perspective images of the digitally rendered planar animations onto the digital virtual 3D image of the surface defining the resort swimming pool or the hotel swimming pool; and digitally render a 3D animation of the electronically baked forced perspective images of the digitally rendered planar animations from a virtual position that is at the same angle and position as a planned angle and location of a digital physical projector to be installed at a site of the resort swimming pool or the hotel swimming pool.

A fourth aspect of the disclosure is a system comprising:

a) a resort swimming pool or the hotel swimming pool contained within a surface defining the resort swimming pool or the hotel swimming pool;

b) a digital computer, the digital computer including a memory and at least one processor programmed by computer software sufficient to make virtual 3D images of the resort swimming pool or the hotel swimming pool and the surface defining the resort swimming pool or the hotel swimming pool, the memory sufficient to hold measurements of the resort swimming pool or the hotel swimming pool and surface defining the resort swimming pool or the hotel swimming pool;

c) the at least one processor programmed by computer software sufficient to create digital virtual 3D models of creative elements to be used in one or more scenes using the computer and the computer software;

d) the at least one processor programmed by computer software sufficient to animate the digital virtual 3D models of the creative elements;

e) the at least one processor programmed by computer software sufficient to place at least some of the animated digital virtual 3D modeled creative elements inside the digital virtual 3D image of the resort swimming pool or the hotel swimming pool using the digital virtual 3D image of the resort swimming pool or the hotel swimming pool and the surface defining the resort swimming pool or the hotel swimming pool to place objects inside the digital virtual 3D image of the resort swimming pool or the hotel swimming pool and cast shadows onto the digital virtual 3D image of the surface defining the resort swimming pool or the hotel swimming pool;

f) the at least one processor programmed by computer software sufficient to light the animated digital virtual 3D modeled creative elements with one or more virtual 3D lighting programs to create the cast shadows;

g) the at least one processor programmed by computer software sufficient to create digitally rendered planar animations of the lighted, animated digital virtual 3D modeled creative elements;

h) the at least one processor programmed by computer software sufficient to virtually project the digitally rendered planar animations back onto the digital virtual 3D image of the surface defining the resort swimming pool or the hotel swimming pool of an empty virtual 3D image of the resort swimming pool or the hotel swimming pool from the same virtual camera position as in the previous step, thereby electronically baking forced perspective images of the digitally rendered planar animations onto the digital virtual 3D image of the surface defining the resort swimming pool or the hotel swimming pool;

i) the at least one processor programmed by computer software sufficient to digitally render a 3D animation of the electronically baked forced perspective images of the virtually projected rendered planar animations from a virtual position that is at the same angle and position as a planned angle and location of a digital physical projector to be installed at a site of the resort swimming pool or the hotel swimming pool and the surface defining the resort swimming pool or the hotel swimming pool;

j) a digital video player or digital server computer sufficient to play and/or loop the 3D animation; and k) one or more digital physical projectors installed on a structure above or to one side of the resort swimming pool or the hotel swimming pool and the surface defining resort swimming pool or the hotel swimming pool in the planned angle and location as the virtual position, the one or more digital physical projectors sufficient to project the digitally rendered 3D animation of the electronically baked forced perspective images of the virtually projected rendered planar animations through the resort swimming pool or the hotel swimming pool and onto the surface defining the resort swimming pool or the hotel swimming pool, completing an illusion of at least some of the lighted, animated digital virtual 3D modeled creative elements in the resort swimming pool or the hotel swimming pool.

It should be understood that wherever the term "comprising" is used herein, other embodiments where the term "comprising" is substituted with "consisting essentially of" are explicitly disclosed herein. It should be further understood that wherever the term "comprising" is used herein, other embodiments where the term "comprising" is substituted with "consisting of" are explicitly disclosed herein.

Other aspects of the disclosure are computer-readable media encoded with processing instructions for implementing the various methods with the systems.

Methods, systems, and computer-readable media of this disclosure will become more apparent upon review of the brief description of the drawings, the detailed description of the disclosure, and the claims that follow. Moreover, the use of negative limitations is specifically contemplated; for example, certain systems, methods, and computer-readable media may comprise a number of physical hardware and software components and features, but may be devoid of certain optional hardware and/or software and/or other features, such as one or more sidewalls or roofs of pool structures. As another example, certain servers suitable for use herein may include software and hardware components pertinent to particular end uses, but may be devoid of other components and/or software, depending on the wishes of the design, facility owner, or other end user. Computers and servers may, in certain embodiments, be devoid of any other use than for use in or with the aspects of this disclosure.

BRIEF DESCRIPTION OF THE DRAWINGS

The manner in which the objectives of the disclosure and other desirable characteristics can be obtained is explained in the following description and attached drawings in which.

Figure 1:
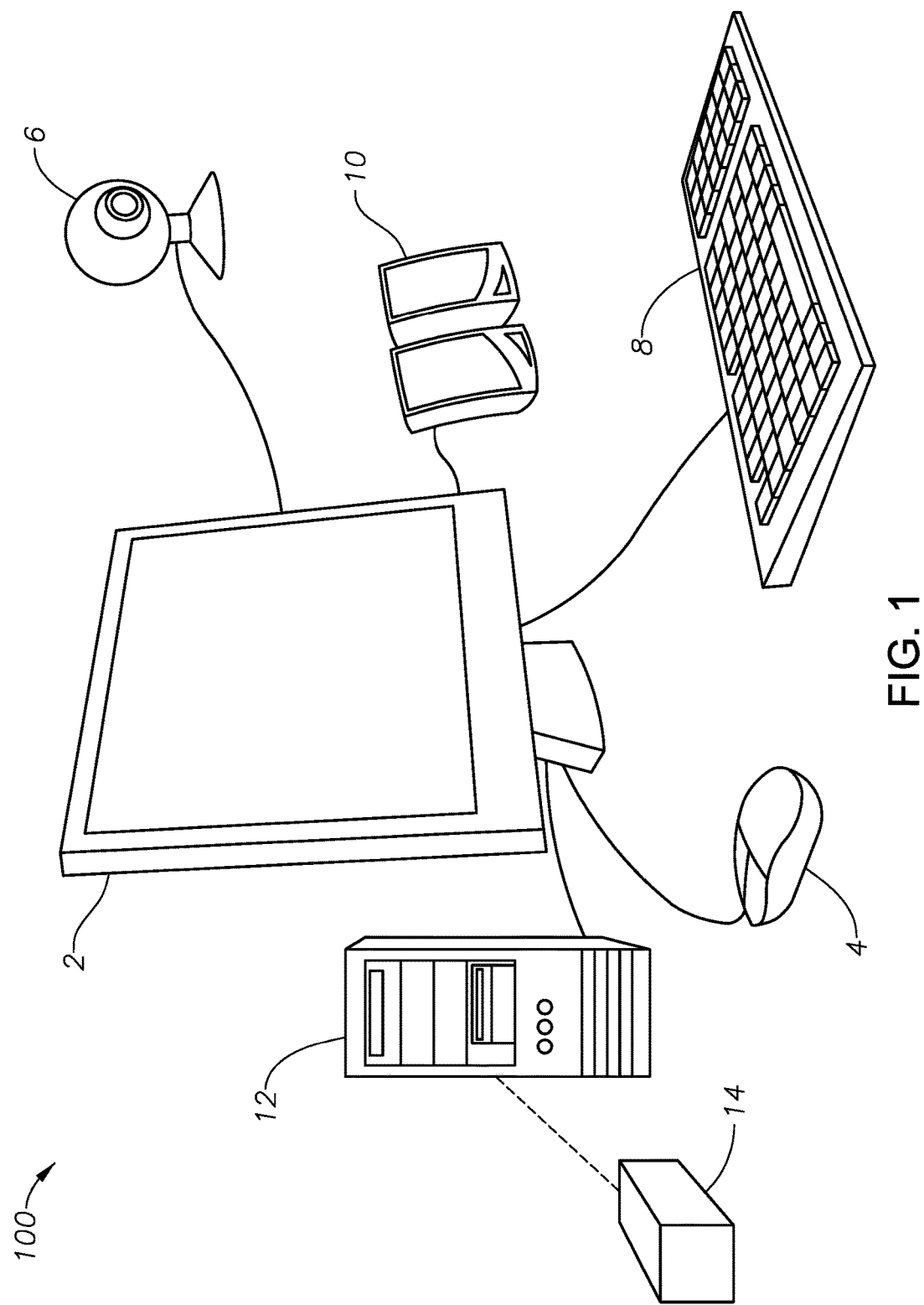
FIGS. 1-2 are schematic illustration of two exemplary hardware configurations that may be utilized to implement aspects of the present disclosure.

It is to be noted, however, that FIGS. 1-4 of the appended drawings are not to scale, and that FIGS. 1-4 5A, 5B, 6A, and 6B illustrate only typical embodiments of this disclosure, and are therefore not to be considered limiting of its scope, for the disclosure may admit to other equally effective embodiments.

DETAILED DESCRIPTION

In the following description, numerous details are set forth to provide an understanding of the disclosed systems and methods. However, it will be understood by those skilled in the art that the systems and methods covered by the claims may be practiced without these details and that numerous variations or modifications from the specifically described embodiments may be possible and are deemed within the claims. All U.S. patent applications and U.S. patents referenced herein are hereby explicitly incorporated herein by reference. In the event definitions of terms in the referenced patents and applications conflict with how those terms are defined in the present application, the definitions for those terms that are provided in the present application shall be deemed controlling.

As explained briefly in the Background, there is currently no known system or method that enables a pool owner to have animated objects in the pool. The closest known competing system and method to the present invention is a color changing light that cycles through a few colors; other than this the system is static and never changing. In essence, pool lights only illuminate the pool, and are static and never changing, aside from this simple color-changing effect. This is initially interesting but quickly becomes boring to users of the pool or pool area. It would be an advance in the entertainment art to make the pool the centerpiece of an event, amaze audiences and guests as well as generate additional revenue stream to resorts, hotels, pool complexes, aquatic centers and any place with a pond, pool, dam or liquid container.

Various terms are used throughout this disclosure. The term "digital" as used herein with terms such as "animating", "rendering", "projecting, "texturing", and the like is similar to its use in the phrase "digital cinematography", and refers to working with videography and digital video. Digital imaging processing has made it possible to radically modify pictures from how they were originally captured. A cinematographer (in the movie-making sense) is responsible for the technical aspects of the images (lighting, lens choices, composition, exposure, filtration, film selection), but works closely with the director to ensure that the artistic features are supporting the director's vision of the story being told, from pre-production to post-production. Cinematography has a temporal aspect, and it is more complex than photography in terms of personnel management and logistical organization. "Digital cinema" refers to the use of digital technology to distribute or project motion pictures as opposed to the historical use of motion picture film. A movie can be distributed via hard drives, the Internet, dedicated satellite links or optical disks such as DVDs and Blu-ray Discs. Digital movies are projected using a digital projector instead of a conventional film projector. In digital cinema, resolutions are represented by the horizontal pixel count, usually "2K" (2048×1080 or 2.2 megapixels) or "4K" (4096×2160 or 8.8 megapixels). In addition to the equipment already found in a film-based movie theater a DCI-compliant digital cinema screen requires a digital projector and a computer known as a "server", such as those available from Doremi Labs, Burbank, Calif. (U.S.A.). "DCI" refers to Digital Cinema Initiatives, a joint venture of the six major movie studios, which publishes a system specification for digital cinema. The specification ensures that 2K content can play on 4K projectors and vica-versa. Smaller resolutions in one direction are also supported (the image gets automatically centered). While much of the specification codifies work that had already been ongoing in the Society of Motion Picture and Television Engineers (SMPTE), the specification is important in establishing a content owner framework for the distribution and security of first-release motion picture content. See also the National Association of Theatre Owners (NATO) Digital Cinema System Requirements, addressing the requirements of digital cinema systems from the operational needs of the exhibitor. Please note that digital cinema differs from HDTV for theatrical presentations, which may be referred to as Electronic Cinema Systems (E-Cinema). The systems and methods of the present disclosure may use DCI-compliant projectors (2k or 4K) or laser projectors.

As used herein the terms "render" and "rendering" mean essentially mixing all components into a final, single continuous clip that can be shared, edited, uploaded or archived. Rendering is generally synonymous with completing, saving, or exporting a file, and a colorful analogy might be "baking your cake". The term "bake in" is similar but refers to adjusting an image or a clip with a non-reversible added element of the initial capture of an image. For instance when baking shadows into an image, they will be set at an angle and when changing the position of the key light or sun will not change the shadow angle—in other words, meaning the shadows are baked in.

The terms "creative elements" and "digital media content" are synonymous as used herein and mean simply virtual content generated using a programmed digital computer or one or more digital cameras. Content may be animals (for example humans, sharks, octopi, fish) plants, underwater structures such as shipwrecks, coral reefs, rocks, and the like and combinations of these (for example coral and plants growing on a shipwreck, or sharks swimming around a shipwreck).

The term "surface" includes wall, roof, side of a swimming pool or other container holding a liquid, and portions of any of these.

The phrases "digital virtual 3D model", "computer model simulation", "digitally animating", "animation" and the like as used herein mean using an open-source or closed-source or other publicly available (for profit or not) version of software with a digital computer so that the computer will be modified to be able to animate or mimic lighting, projection in a virtual body of liquid, or physical features of a body of liquid and creative elements. Several examples are provided in the following paragraphs. One such software is known as CINEMA 4D® (from MAXON Computer GmbH), which software allows 3D modeling, animation, rendering, post-production, interactive creation (including texturing) and playback. The software known as CINEMA 4D includes options for 3D unwrapping, shading, physics, dynamics and particles, real time 3D/game creation, and camera projection shading. Tools are also included for 2D and 3D procedural brushes, edge rendering, collision simulation, and the like. Many 2D and 3D file formats are supported. For example, CINEMA 4D has integration software known under the trade designation CINEWARE built into the program, allowing seamless integration of 3D scenes from CINEMA 4D straight into digital rendering, projection, and texturing software such as that known under the trade designation AFTER EFFECTS® (Adobe Systems Incorporated). The software known under the trade designation CINEMA 4D also allows any changes to the 3D scene to automatically be updated inside of the After Effects software. The software known under the trade designation CINEMA 4D also includes a software toolset known under the trade designation MOGRAPH, which enables creation of things like flying logos and simple effects. Another commercially available simulation software package includes the software known under the trade designation AUTODESK® MAYA®, a 3D computer graphics software that currently runs on digital computer operating systems known under the trade designations MICROSOFT® WINDOWS®, APPLE® OS X™, and LINUX®, originally developed by Alias Systems Corporation (formerly Alias|Wavefront) and currently owned and developed by Autodesk, Inc. It is used to create interactive 3D applications, including video games, animated film, TV series, or visual effects.

So-called "game engines" may be employed for creating digital virtual 3D models of bodies of liquid and creative elements, including animating, lighting, texturing, rendering. The game engine known under the trade designation CRYENGINE® is a game engine designed by the German game developer Crytek GmbH.

The 3D modeling software known as 3DS MAX® provides a comprehensive modeling, animation, simulation, and rendering solution for games, film, and motion graphics artists. The software known as 3DS MAX delivers efficient new tools, accelerated performance, and streamlined workflows to help increase overall productivity for working with complex, high-resolution assets.

The game engine known under the trade designation UNREAL™ or THE UNREAL ENGINE™ is a game engine developed by Epic Games, Inc. first showcased in the 1998 first-person shooter game UNREAL™. Although primarily developed for first-person shooters, it has been successfully used in a variety of other genres, including stealth, MMORPGs, and other RPGs. With its code written in C++, the Unreal Engine features a high degree of portability and is a tool used by many game developers today.

The software known as MODO® is a polygon and subdivision surface modeling, sculpting, 3D painting, animation and rendering package developed by Luxology, LLC, which is now merged with and known as The Foundry Group, LLC. The program incorporates features such as n-gons and edge weighting, and currently runs on digital computer operating systems known under the trade designations MICROSOFT® WINDOWS®, APPLE® OS X™, and LINUX®.

The software known under the trade designation Unity® (from Unity IPR ApS, Denmark) is a game development ecosystem, a rendering engine fully integrated with a complete set of intuitive tools and rapid workflows to create interactive 3D and 2D content, and allows multiplatform publishing, allows use of thousands ready-made assets available from an online store known as the ASSET STORE™, and a knowledge-sharing community. The software currently runs on digital computer operating systems known under the trade designations MICROSOFT® WINDOWS®, APPLE® OS X™, and LINUX®.

The software known under the trade designation HOUDINI™ is a high-end 3D animation application software developed by Side Effects Software, Inc., of Toronto, Canada. Side Effects adapted HOUDINI™ from the PRISMS™ suite of procedural generation software tools. Its exclusive attention to procedural generation distinguishes it from other 3D computer graphics software. The software known under the trade designation HOUDINI™ has been used in various feature animation productions, including the following: the DISNEY® feature films CHICKEN LITTLE™ and FROZEN™; the film RIO™, a Blue Sky Studios film; and the feature animation ANT BULLY™.

The software known under the trade designation NUKE™ is a node-based digital compositing software produced and distributed by The Foundry Group, LLC, and used for film and television post-production. The software currently runs on digital computer operating systems known under the trade designations MICROSOFT® WINDOWS®, APPLE® OS X™, and LINUX®. The software's users include Digital Domain™, Walt Disney® Animation Studios, DREAMWORKS® Animation LLC, Sony™ Pictures Imageworks™, Sony Pictures Animation, Framestore, Weta Digital and Industrial Light & Magic. The software has been used on productions such as AVATAR™, MR. NOBODY™, THE CURIOUS CASE OF BENJAMIN BUTTON™, KING KONG™, JUMPER™, I, ROBOT™, RESIDENT EVIL: EXTINCTION™, TRON: LEGACY™, ALICE IN WONDERLAND™, BLACK SWAN and THE HOBBIT™.

The software known under the trade designations PHOTOSHOP® and ILLUSTRATOR®, from Adobe Systems Inc. may be used. The software PHOTOSHOP has become the de facto industry standard in raster graphics editing, such that the terms "photoshopping" and "photoshop contest" were born. It can edit and compose raster images in multiple layers and supports masks, alpha compositing and several color models including RGB, CMYK, L a b color space (with capital L), spot color and duotone. The software has vast support for graphic file formats but also uses its own PSD and PSB file formats which support all the aforementioned features. In addition to raster graphics, it has limited abilities to edit or render text, vector graphics (especially through clipping path), 3D graphics and video. The software's feature set can be expanded by plug-ins, programs developed and distributed independently of Adobe Systems, Inc., that can run inside it and offer new or enhanced features.

"Computer" and "digital computer" as used herein include, but are not limited to, commercially available devices selected from the group consisting of a hand-held computer, a laptop computer, a desktop computer, and a tablet computer, where the digital computer includes at least one digital processor and at least enough data memory to store the physical dimensions of the body of liquid and its surface (preferably multiple bodies of liquid and their surfaces), and store and execute computer program products (referred to herein as software) suitable for performing the functions of creating virtual bodies of liquid and creative elements, animating, lighting, and so on as discussed herein. Those skilled in the art will understand that it is entirely possible to store and perform one or more of the computer program products on any computer, for example, on the digital computer of the system or on a remote server.

"Server" as used herein includes special electronic devices, similar to a computer, but more powerful and optionally having DCI-specific hardware and software features (or other standards setting organization features) when the system or method is used in commercial settings, such as resort hotel swimming pools. A DCI-compliant server may not be required in some venues, so the term includes non-DCI-compliant servers. "DCI" refers to "Digital Cinema Initiative", a standards setting group formed by major movie production houses.

Certain system embodiments of this disclosure may include wherein a structure for containing a body of liquid comprises a rear wall, a front wall, a floor, and left and right side walls. Certain system embodiments of this disclosure may include wherein the digital projector transmits an image at a resolution, represented by horizontal pixel count, of at least 2K (2048×1080 or 2.2 megapixels), more preferably at least 4K (4096×2160 or 8.8 megapixels). Certain system and kit embodiments of this disclosure may include wherein the digital projector is selected from the group consisting of DLP and laser cinema projectors. As used herein the phrase "electronically connected" means either wireless, wired, or both. Certain embodiments of this disclosure may include systems and methods wherein the server computer supports JPEG2000 and MPEG2 files, and dual-projector 3D playback. Certain embodiments of this disclosure may include systems and methods wherein the surface is a reflecting surface. Certain embodiments of this disclosure may include systems and methods wherein at least one portion of the surface is a light reflecting surface. Certain embodiments of this disclosure may include systems and methods wherein at least one of the surfaces is a wall, for example, but not limited to, a wall of a swimming pool.

In the specific context of the present disclosure, certain methods, systems, and computer-readable media (referred to alternatively as "software" herein) of the present disclosure may be referred to as RAYLIGHT4D™, although this disclosure is explicitly not so limited. The system and method currently known under the trade designation RAYLIGHT4D™ was developed to meet certain unique needs of resort hotel swimming pools and other venues where the owners wish to work within the existing venue structure. In certain embodiments, the software may comprise features similar to those described above with reference to software commercially available discussed herein. To facilitate ease of use getting data in and out to conform with perceived perspective using software embodiments such as that known under the trade designation RAYLIGHT4D™, a back-end system, such as the software and hardware known under the trade designation PANDORAS BOX SERVER, from COOLUX® Media Systems GmbH, may be employed. This back-end software and hardware provides a turnkey solution that perfectly unites state of the art rendering technology with intuitive media and show control, and provides a high-quality server featuring the most powerful render-engine, offering real-time compositing in 3D and allows for projection onto any shape and any surface. The systems allow arranging videos and images freely, changing color, form and position, and synchronize all video and audio sources, and allows on-site 3D rendering, composition and editing for any live event or multi-media show. Another back-end system, such as the software and hardware known under the trade designation GREEN HIPPO™ (from Green Hippo, London, England) may be used to provide high resolution, multi-server displays. However, high-resolution media encoding, due to the substantial size of the source media, is a major task for any server to undertake, especially when programming a show whilst encoding simultaneously.

As used herein the phrase "Digital Cinema Package" (DCP) is a collection of digital files used to store and convey digital cinema (DC) audio, image, and data streams. The term has been defined by Digital Cinema Initiatives, LLC in their recommendations for packaging of DC contents. General practice adopts a file structure that is organized into a number of usually multi-gigabyte size Material eXchange Format (MXF) files, which are separately used to store audio and video streams, and auxiliary index files in XML format. The MXF track files contain image and audio essence that are compressed and encoded in order to reduce the huge amount of required storage. Encryption is an optional solution and is used to protect from unauthorized use. The image track file contains compressed JPEG 2000 essence and the audio is a wrapped 24 bit linear PCM multichannel WAV file. The adopted (optional) encryption standard is AES 128 bit in CBC mode. The newer SMPTE (Society of Motion Picture & Television Engineers) standards are used to conform the recommendations among different tool vendors and producers. Legacy DCP standard, MXF and DPX, file to the software known under the trade designation TRAPPERVISION™.

Specific non-limiting system, method, and computer-readable media embodiments in accordance with the present disclosure will now be presented in conjunction with FIGS. 1-4, 5A, 5B, 6A, and 6B. The same numerals are used for the same or similar features in the various figures. In the views illustrated in FIGS. 1-4 it will be understood in each case that the figures are schematic in nature, and certain conventional features are not illustrated in order to illustrate more clearly the key features of each embodiment.

Figure 2:
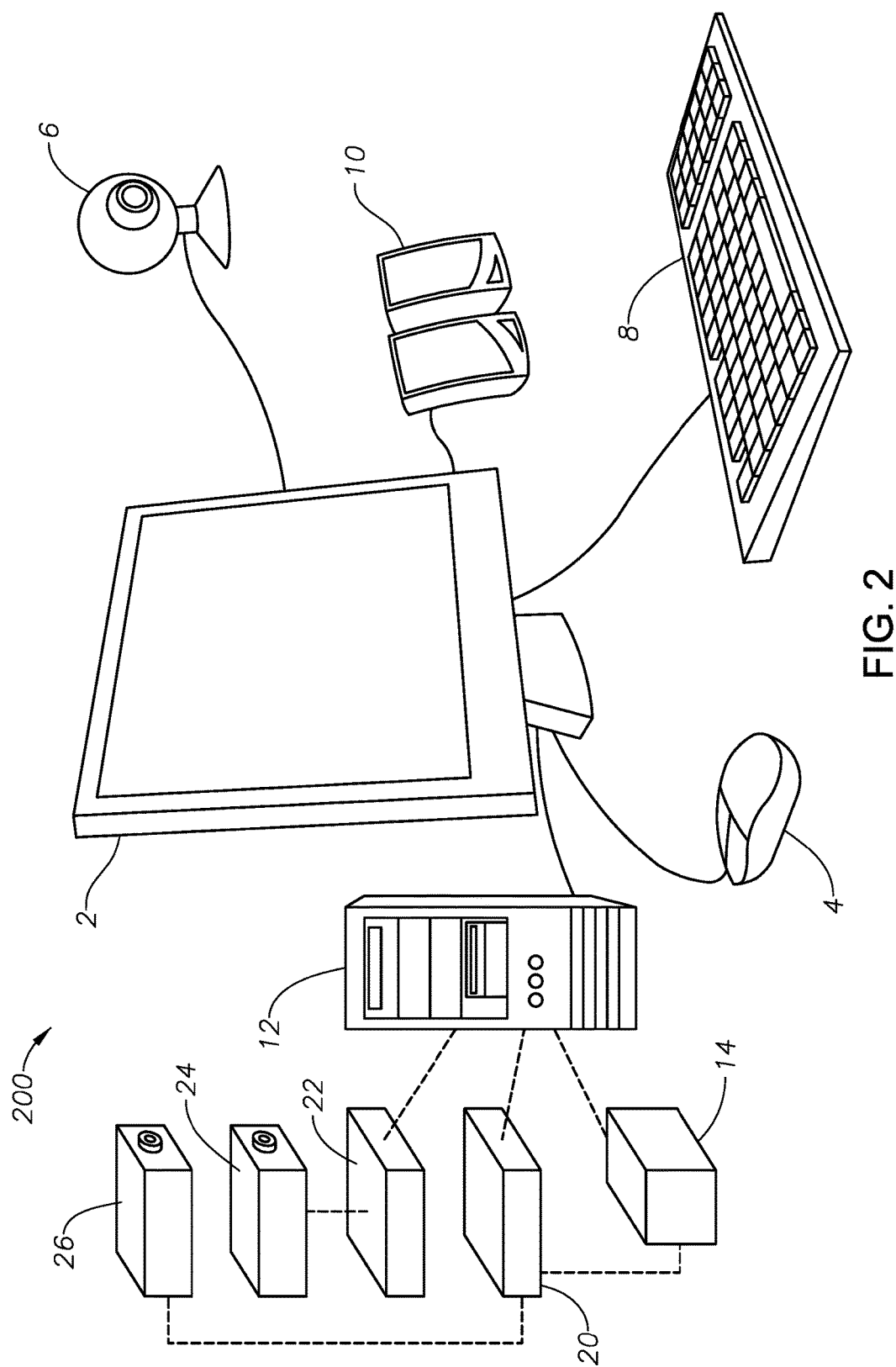

FIGS. 1-2 are schematic illustration of two exemplary hardware configuration embodiments 100 and 200 that may be utilized to implement aspects of the present disclosure. Embodiment 100 includes a viewing monitor 2, a mouse or other cursor controller 4, a camera 6, a keyboard 8, speakers 10, a cabinet 12 enclosing one or more digital computer processor (or microprocessor) and memory modules, and a digital modem 14. It will be appreciated that other arrangements are possible. For example, in the desktop computers known under the trade designation IMAC from Apple Inc., there is no cabinet 12, and the microprocessor(s) and memory module(s) reside in monitor 2. Another variation is that camera 6 may be replaced by, or the system augmented by, one or more external hard drives, memory modules disk drives, and the like. It will also be appreciated that one or more wired connections may be wireless connections, such as depicted by the dashed line between cabinet 12 and modem 14.

Referring now to FIG. 2, system embodiment 200 includes all the components of system 100, but further includes a digital video player 20, a digital server computer 22, a digital DLP projector 24, and/or a digital laser projector 26.

Figure 3:
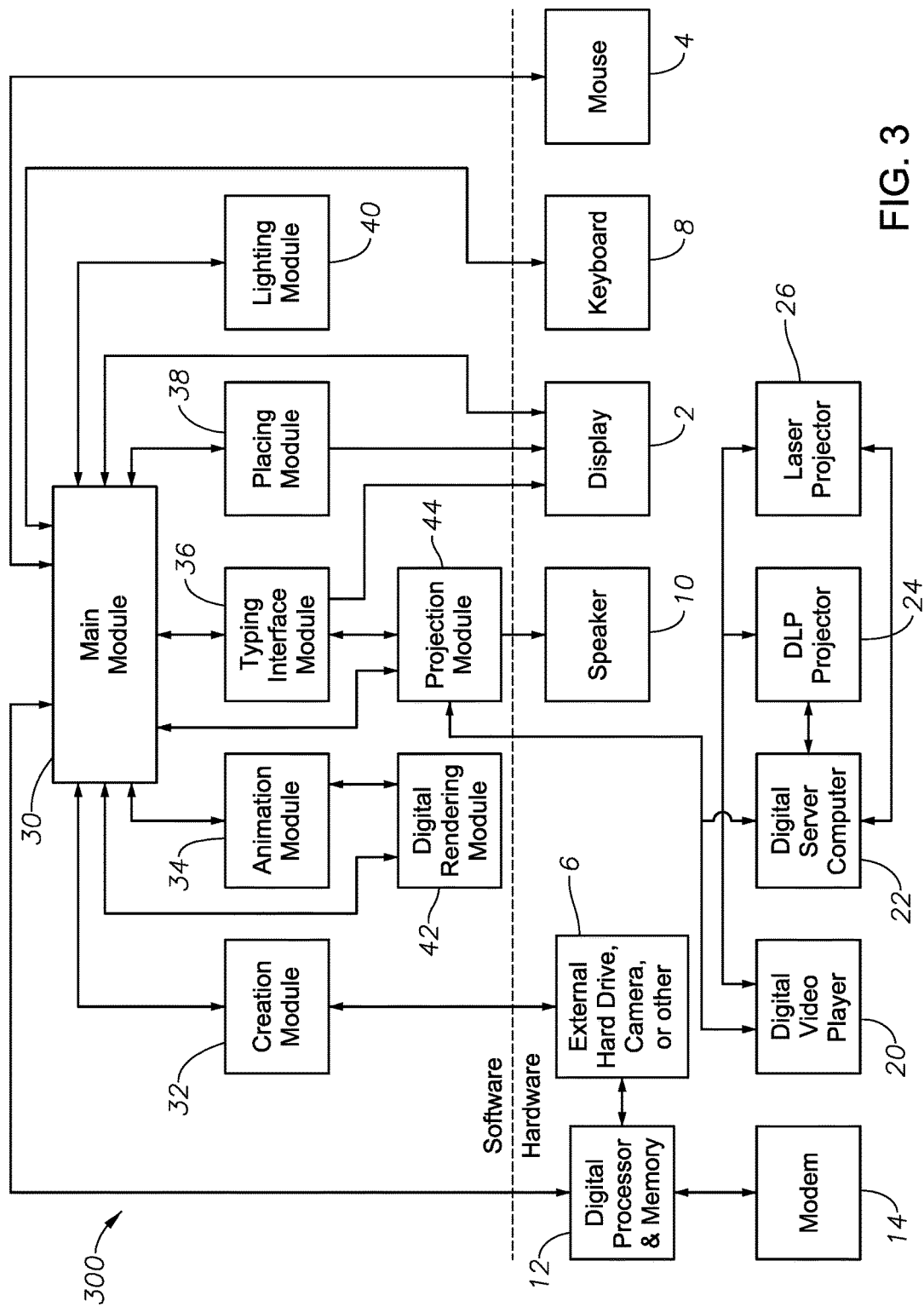
FIG. 3 is an example of a flow diagram of the embodiments of FIGS. 1 and 2, illustrating exemplary hardware and software modules that may be utilized to implement aspects of the present invention.

In both systems 100 and 200, the digital computer processor or microprocessor (there could be one or more) has loaded or saved thereon software components or modules sufficient to carryout the various tasks discussed herein, such as illustrated in the flow diagram of embodiment 300 of FIG. 3. Referring to FIG. 3, FIG. 3 is an example of a flow diagram 300 of embodiments 100 and 200 of FIGS. 1 and 2, illustrating exemplary hardware and software modules that may be utilized to implement aspects of the present invention. In certain embodiments, the primary users of the embodiments of the present inventions are the actors who will acquire, install, and run the program, and utilize its output, such as entertainment personnel including directors, directors' assistants, and technicians. The secondary users of the embodiments of the present inventions are the actors who will interact with the program and use it to communicate an entertainment show to tertiary users, such as hotel guests. The input to the systems and methods of the embodiments of the present invention are images created by or obtained by the primary actors. In a preferred embodiment of the present invention, the secondary user or users will interact with the output of the system. The output of the systems and methods of the embodiments of the present invention are the 2D and/or 3D animated scenes that the secondary user wishes to use to entertain or educate the tertiary users (guest, students, and so on). Embodiment 300 includes a main software module 30, for example one of the game engines previously noted, which interacts with an element creation module 32, an animation module 34, a typing interface module 36, a placing or positioning module 38, and a lighting module 40, as well as a digital rendering module 42 and a projection module 44. Modules 30, 32, 34, 36, 38, 40, 42, and 44 are all software modules, and it will be understood that FIG. 3 is only a schematic representation illustrating one possible arrangement of software and hardware. Hardware and software are illustrated as being separated by a dashed line. Main software module 30 interacts with a primary user through a graphic user interface ("GUI") displayed on monitor 2, to create the creative elements, and animate, place, light, render, and project the creative elements virtually, using the keyboard 8 and mouse 4. If the primary user selects to view a tutorial (not illustrated), a request for a tutorial may sent to the main module 30, which launches a tutorial module. The tutorial module then shows the primary user how to use the system. The double-headed arrows indicate interactions between software modules, and between software modules and hardware components. For example, one modification may be to combine one or more of software modules 30, 32, 34, 36, 38, 40, 42, and 44. Once the primary user is sufficiently familiar with the system, the user instructs main module 30 to create a desired image user creation module 32. In response, the image creation module 32 presents options to the user. The user may direct the image creation module 32 to use a camera 6, or obtain creative elements from a database on a hard drive. If the creation module 32 detects a camera 6, which may be a webcam, it connects and forwards the image request to webcam 6. In a response, webcam 206 captures real-time images of the desired creative element (fish, dolphin, plant). Image creation module 32 retrieves and forwards the real-time or other images to the main module 30. The main module 30 forwards the images to animation module 34, which animates the image of the creative element. Animation module 34 sends the animated creative element to main module 30, which sends the animated creative element to placing module, which places the animated creative element in the virtual pool where desired by the primary user. Main module 30 interacts with lighting module 40 to provide desired lighting and corresponding shadows to the animated creative element. Main module 30 then directs digital rendering module 42 to render the lighted, animated creative element or elements. The rendered creative elements are then virtually projected, as explained in the example herein.

Figure 4:
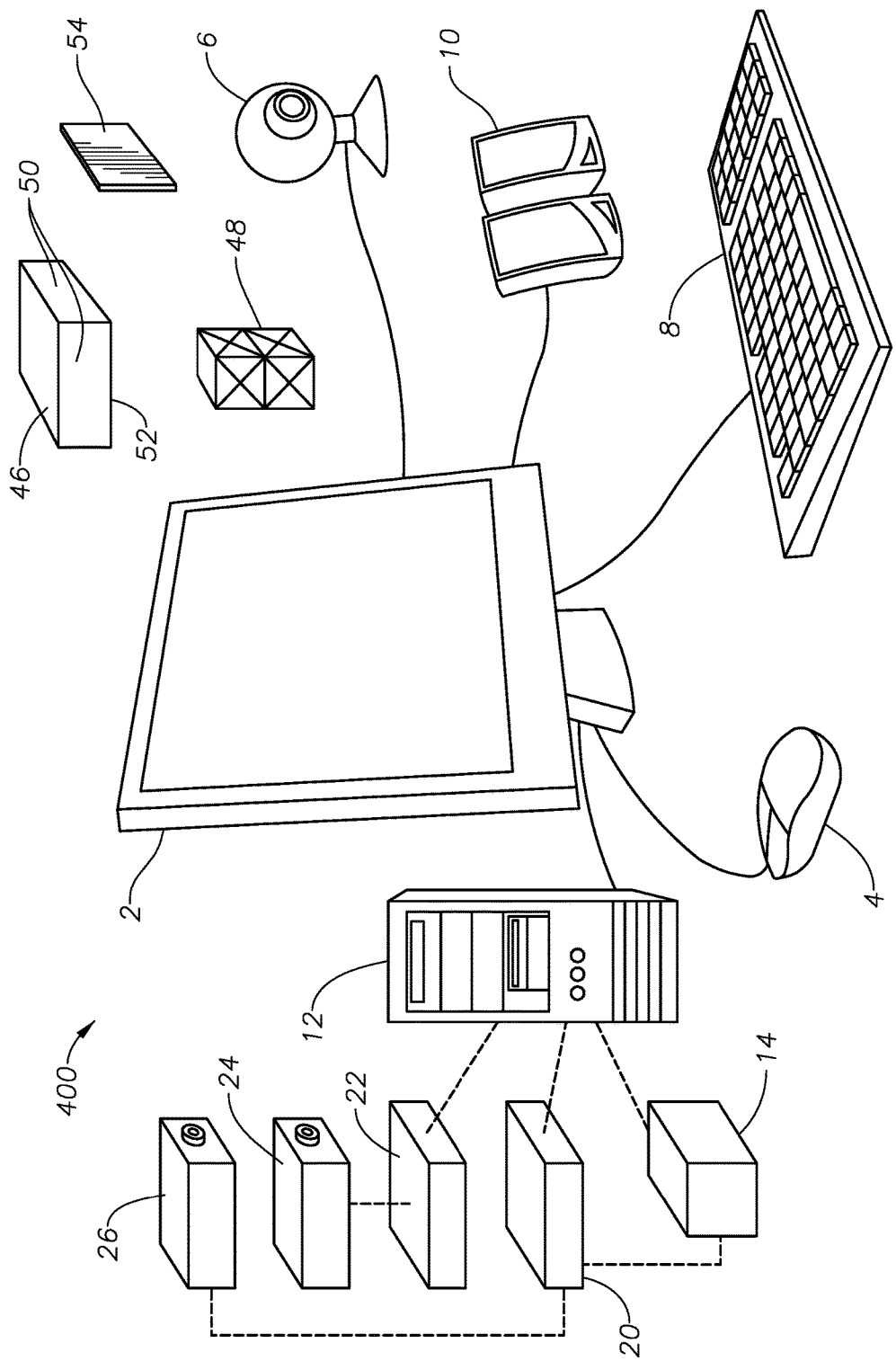
FIG. 4. is a schematic illustration of an exemplary kit that may be utilized to implement aspects of the present disclosure.
Figure 5A:
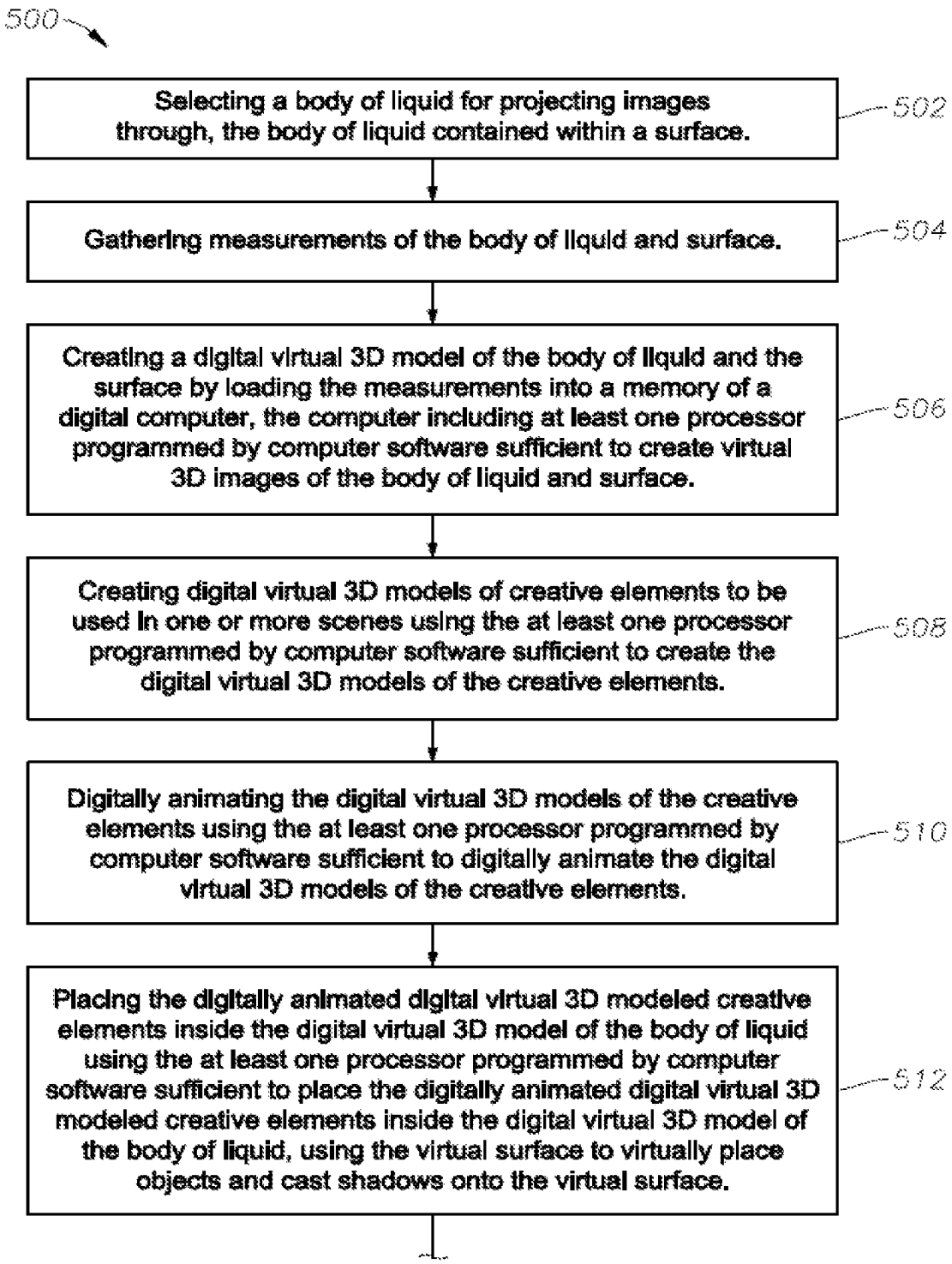
FIGS. 5A and 5B, and FIGS. 6A and 6B are logic diagrams of two method embodiments of the present disclosure.
Figure 5B:
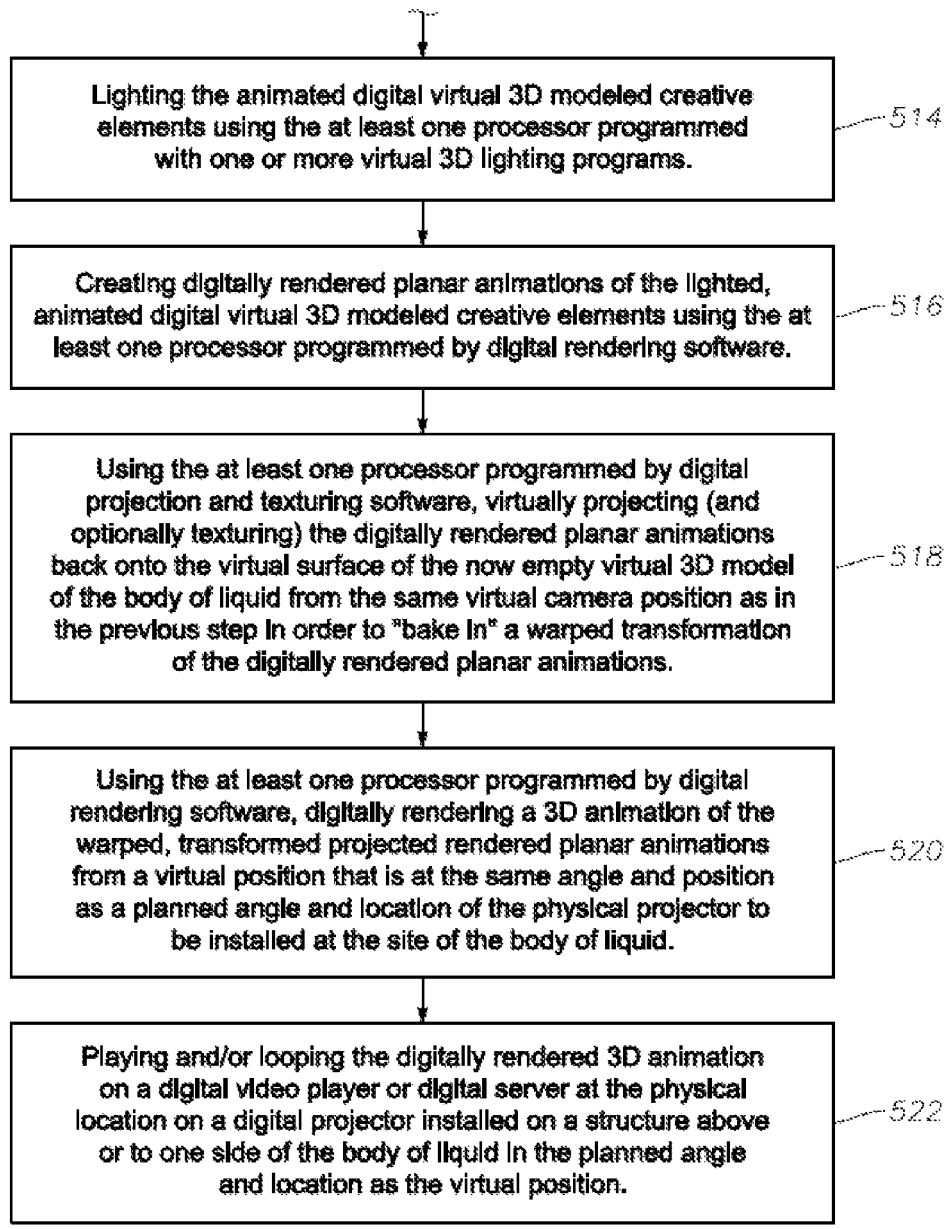

FIG. 4 is a schematic illustration of an exemplary kit embodiment 400 that may be utilized to implement aspects of the present disclosure. Kit embodiment 400 includes all of the system components of system embodiment 200, but further includes a structure 46 for containing a body of liquid (for example an aquarium, swimming pool, fountain, and the like), optionally a support structure 48 (such as a scaffold, electronics cabinet, or the like) for supporting one or more digital projectors 24, 26, and optionally a light-reflecting screen 54. Light-reflecting screen 54 may be included in certain kit embodiments where structure 46 is an aquarium or similar liquid container. Structure 46 may have sidewalls 50 and a floor 52, wherein one or more of the sidewalls is transparent. Structure 46 may comprise any of a number of shapes, such as rectangular (including square), oval, polygonal, circular, and the like.

FIGS. 5A, 5B, 6A, and 6B are logic diagrams of two method embodiments of the present disclosure. Method embodiment 500 illustrated in FIGS. 5A and 5B includes the steps of selecting a body of liquid for projecting images through, the body of liquid contained within a surface, box 502; gathering measurements of the body of liquid and surface, box 504; creating a digital virtual 3D model of the body of liquid and the surface by loading the measurements into a memory of a digital computer, the computer including at least one processor programmed by computer software sufficient to create virtual 3D images of the body of liquid and surface, box 506; creating digital virtual 3D models of creative elements to be used in one or more scenes using the at least one processor programmed by computer software sufficient to create the digital virtual 3D models of the creative elements, box 508; digitally animating the digital virtual 3D models of the creative elements using the at least one processor programmed by computer software sufficient to digitally animate the digital virtual 3D models of the creative elements, box 510; placing the digitally animated digital virtual 3D modeled creative elements inside the digital virtual 3D model of the body of liquid using the at least one processor programmed by computer software sufficient to place the digitally animated digital virtual 3D modeled creative elements inside the digital virtual 3D model of the body of liquid, using the virtual surface to virtually place objects and cast shadows onto the virtual surface, box 512; lighting the animated digital virtual 3D modeled creative elements using the at least one processor programmed with one or more virtual 3D lighting programs, box 514; creating digitally rendered planar animations of the lighted, animated digital virtual 3D modeled creative elements using the at least one processor programmed by digital rendering software, box 516; using the at least one processor programmed by digital projection and texturing software, virtually projecting (and optionally texturing) the digitally rendered planar animations back onto the virtual surface of the now empty virtual 3D model of the body of liquid from the same virtual camera position as in the previous step in order to "bake in" a warped transformation of the digitally rendered planar animations, box 518; using the at least one processor programmed by digital rendering software, digitally rendering a 3D animation of the warped, transformed projected rendered planar animations from a virtual position that is at the same angle and position as a planned angle and location of the physical projector to be installed at the site of the body of liquid, box 520; and playing and/or looping the digitally rendering a 3D animation on a digital video player or digital server at the physical location on a digital projector installed on a structure above or to one side of the body of liquid in the planned angle and location as the virtual position, box 522.

Figure 6A:
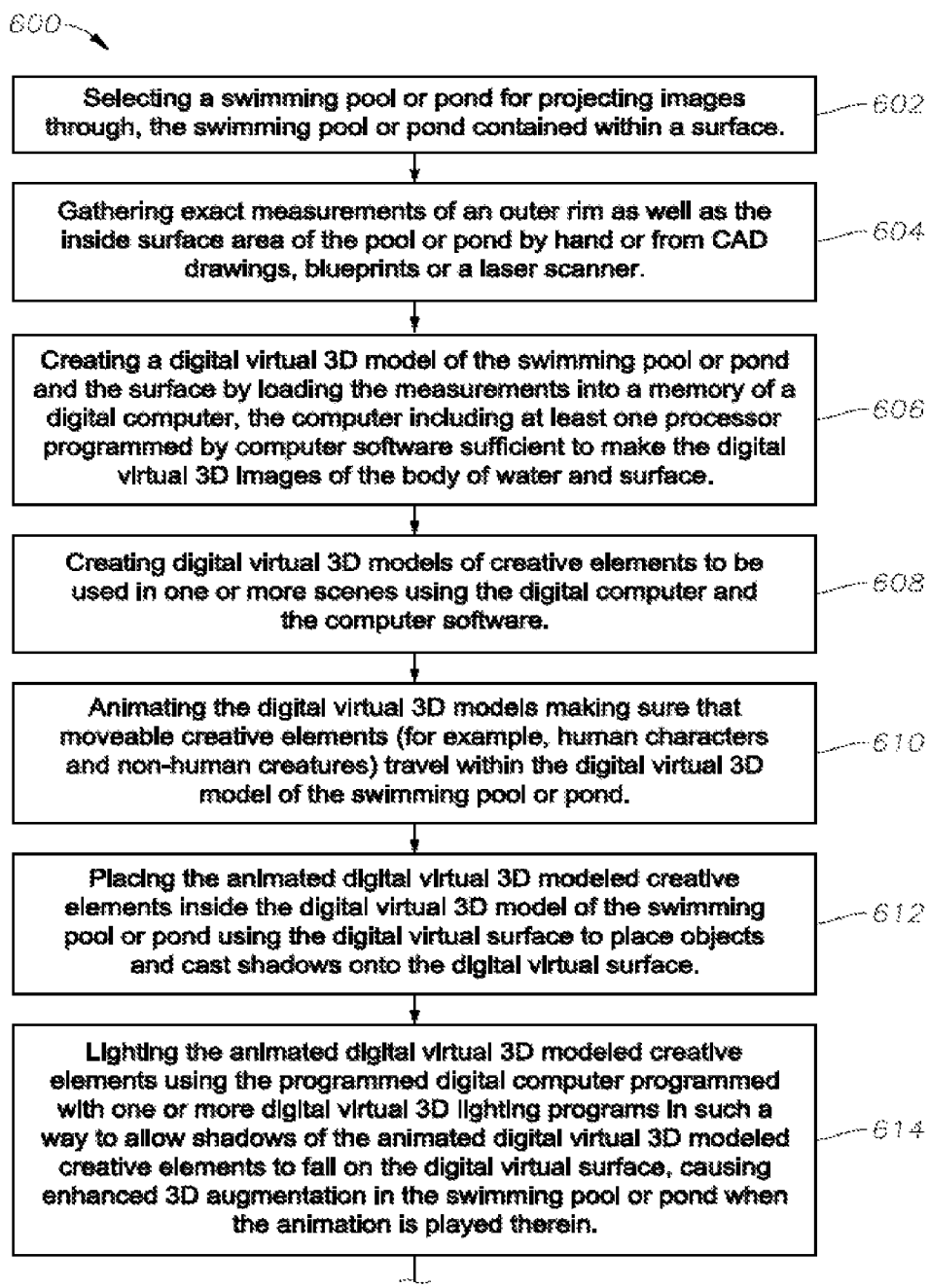
Figure 6B:
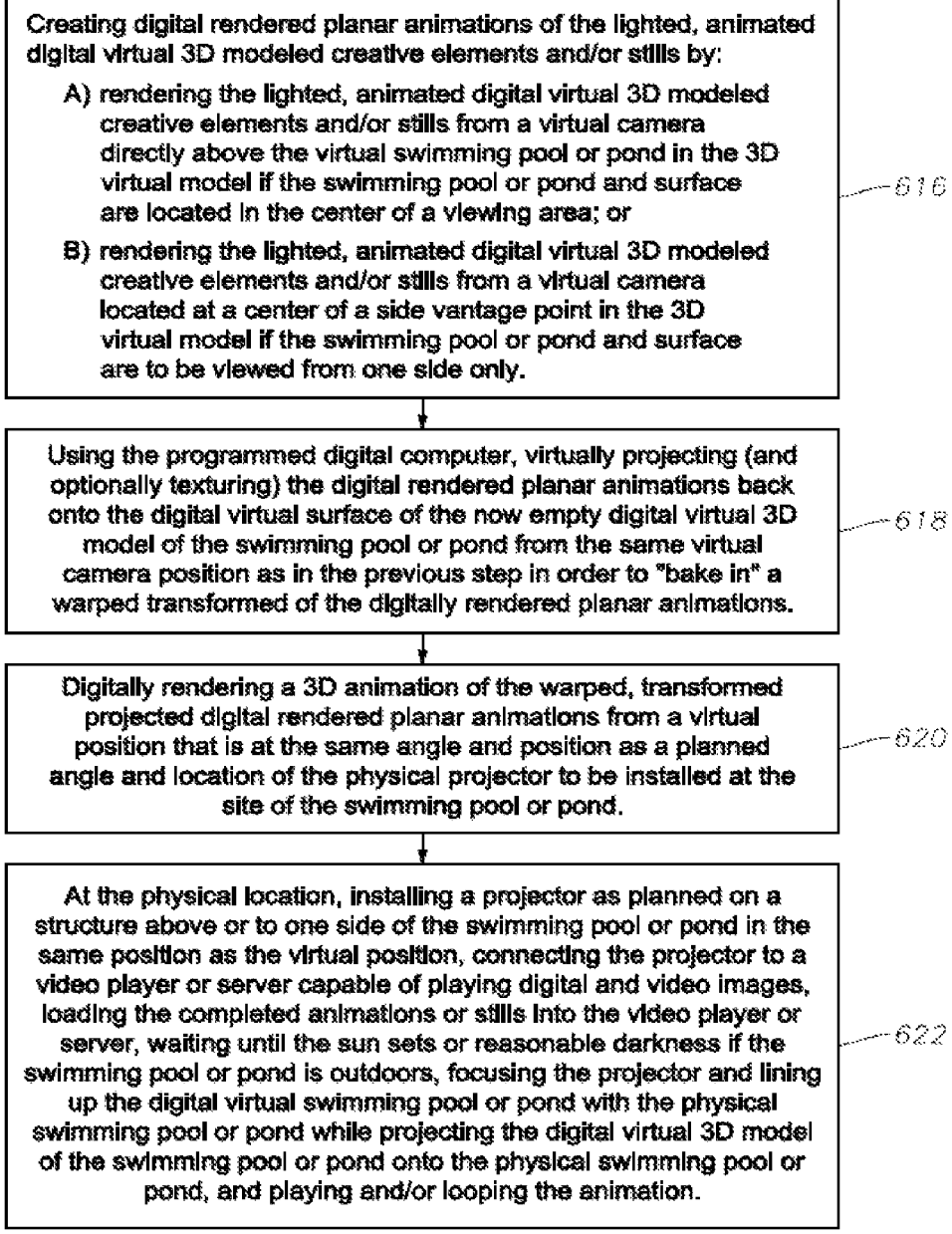

Method embodiment 600 illustrated in FIGS. 6A and 6B includes the steps of selecting a swimming pool or pond for projecting images through, the swimming pool or pond contained within a surface, box 602; gathering exact measurements of an outer rim as well as the inside surface area of the pool or pond by hand or from CAD drawings, blueprints or a laser scanner, box 604; creating a digital virtual 3D model of the swimming pool or pond and the surface by loading the measurements into a memory of a digital computer, the computer including at least one processor programmed by computer software sufficient to make the digital virtual 3D images of the body of water and surface, box 606; creating digital virtual 3D models of creative elements to be used in one or more scenes using the digital computer and the computer software, box 608; animating the digital virtual 3D models making sure that moveable creative elements (for example, human characters and non-human creatures) travel within the digital virtual 3D model of the swimming pool or pond, box 610; placing the animated digital virtual 3D modeled creative elements inside the digital virtual 3D model of the swimming pool or pond using the digital virtual surface to place objects and cast shadows onto the digital virtual surface, box 612; lighting the animated digital virtual 3D modeled creative elements using the programmed digital computer programmed with one or more digital virtual 3D lighting programs in such a way to allow shadows of the animated digital virtual 3D modeled creative elements to fall on the digital virtual surface, causing enhanced 3D augmentation in the swimming pool or pond when the animation is played therein, box 614; creating digital rendered planar animations of the lighted, animated digital virtual 3D modeled creative elements and/or stills by (box 616): A) rendering the lighted, animated digital virtual 3D modeled creative elements and/or stills from a virtual camera directly above the virtual swimming pool or pond in the 3D virtual model if the swimming pool or pond and surface are located in the center of a viewing area; or B) rendering the lighted, animated digital virtual 3D modeled creative elements and/or stills from a virtual camera located at a center of a side vantage point in the 3D virtual model if the swimming pool or pond and surface are to be viewed from one side only; using the programmed digital computer, virtually projecting (and optionally texturing) the digital rendered planar animations back onto the digital virtual surface of the now empty digital virtual 3D model of the swimming pool or pond from the same virtual camera position as in the previous step in order to "bake in" a warped transformation of the digitally rendered planar animations, box 618; digitally rendering a 3D animation of the warped, transformed projected digital rendered planar animations from a virtual position that is at the same angle and position as a planned angle and location of the physical projector to be installed at the site of the swimming pool or pond, box 620; and at the physical location, installing a projector as planned on a structure above or to one side of the swimming pool or pond in the same position as the virtual position, connecting the projector to a video player or server capable of playing digital and video images, loading the completed animations or stills into the video player or server, waiting until the sun sets or reasonable darkness if the swimming pool or pond is outdoors, focusing the projector and lining up the digital virtual swimming pool or pond with the physical swimming pool or pond while projecting the digital virtual 3D model of the swimming pool or pond onto the physical swimming pool or pond, and playing and/or looping the animation, box 622.

Example: Installation in Swimming Pool, Sheraton Waikiki Hotel, Hawaii

Two unique light show stories including "Helumoa—the birth of Hawaii" and "Helumoa—the legendary story of Waikiki" were produced for the outdoor pool at the Sheraton Waikiki Hotel. "Helumoa—the birth of Hawaii" begins with a lively display of hot lava flowing from volcanic eruptions depicting the creation of Hawaiian Islands thousands of years ago. The show illustrated how the art of ancient hula were native Hawaiians way of storytelling and sharing the story of ancient Hawaiian na aumakua or ancestor deities. The second 3D pool mapping light show, "Helumoa—the legendary story of Waikiki" illustrated the early days of Waikiki starting with an introduction to the ancient Hawaiian water sport of surfing and the rise of two of Hawaii's most historical resorts, Moana Surfrider, A Westin Resort & Spa which opened in 1901 and The Royal Hawaiian, a Luxury Collection Resort which opened in 1927. The system comprised 5×40K lumen and 2×20 k lumen projectors and ran Pro Video Player servers streaming close to 22 million pixels.

Item/Step Number 1. Once this swimming pool was selected, exact measurements of the outer rim as well as the inside surface area of the pool (7,503 square-foot of pool) were made using blueprints of the pool and a laser scanner. The laser scanner was a model Faro Focus x 330, available from Faro, Barcelona, Spain. The laser scanner created a laser scanned point cloud.

Item/Step Number 2. A virtual 3D model of the pool was created using the measurements taken in Item/Step Number 1 using 3D computer software known under the trade designation CINEMA 4D® (from MAXON Computer GmbH) running on a Mac Pro computer (Apple Computer, Cupertino, Calif., U.S.A.) including a Xeon® microprocessor (from Intel® Corporation, Santa Clara, Calif., U.S.A.). (Another commercially available 3D animation, modeling, simulation, rendering, and compositing software that could have been used in Steps 2-8 was that known under the trade designation Autodesk® Maya®, available from Autodesk Inc., San Rafael, Calif., U.S.A.)

Item/Step Number 3. 3D models of creative elements used in the scene (dolphins, fish, lava) were created using the computer and the 3D computer software.

Item/Step Number 4. The 3D models were animated using the computer and the 3D computer software making sure that characters and creatures traveled within the area of the intended surface of the swimming pool.

Item/Step Number 5. The animated 3D models were placed and animated using the computer and the 3D computer software inside the virtual 3D replica of the pool using the surface of the replica to place objects and cast shadows thereon.

Item/Step Number 6. The animations were virtually lighted using the computer and the 3D computer software using 3D lighting techniques in such a way to allow shadows to fall on the sides and bottom of the virtual pool area; this enhanced the 3D augmentation in the real physical pool.

Item/Step Number 7. Since the pool in this case was located in the center of the viewing area, the 3D animations or stills from a camera were rendered directly above the virtual pool using the computer and the 3D computer software.

Item/Step Number 8 (alternative to Item/Step Number 7) In cases where the viewer's vantage point is from one side only, then the animations would be rendered from the center of this vantage point in the 3D virtual model.

Item/Step Number 9. Using the computer and the 3D computer software known under the trade designation Photoshop® and After Effect®, both available form Adobe Systems Incorporated, San Jose, Calif., U.S.A., the digitally rendered planar animations were digitally projected and textured back onto the surface of the now empty 3D virtual pool model from the same camera position as in step 7 (or step 8 in cases where the viewer's vantage point is from one side only).

Item/Step Number 10. Using the computer and the 3D computer software used in Steps 2-8, the digitally projected image was digitally rendered from the same angle and position as the angle and location of the physical projectors installed at the site.

Item/Step Number 11. (Alternative to Step 10) In cases where the body of liquid has an internal installed projector, digitally render the animations or stills from the same angle as the internal projector using a spherical, fisheye or mirrored lens.

Item/Step Number 12. At the physical location of the Sheraton Waikiki Hotel, 5×40K lumen and 2×20 k lumen projectors were installed as planned on a structure above the pool surface area. This was the same as the virtual position described in step 10.

Item/Step Number 13. In the case of an internal (existing light replacement) projector, the glass lens would be replaced with a manufactured bubble lens to accommodate the wide, fisheye or mirror lens.

Item/Step Number 14. A server computer known under the trade designation ProVideoServer™, available from Renewed Vision, LLC, Alpharetta, Ga. (U.S.A.) was connected to the projectors. The server was streaming close to 22 million pixels.

Item/Step Number 15. The completed animations or stills mentioned in steps 10 & 11 were loaded onto the video player.

Item/Step Number 16. We waited until the sun set or reasonable darkness, this being an outdoor pool.

Item/Step Number 17. The projectors were focused and the image of the virtual pool was aligned with the physical pool. We were now projecting the virtual 3D pool onto the physical pool.

Item/Step Number 18. The animation was played and looped using the server mentioned in Step 14 and the projectors mentioned in Step 12. The 3D pool mapping light show was projected onto over 7,503 square-foot of pool.

In general, the methods of this disclosure may be summarized as gathering the data from the site to recreate it in 3D using the computer and the 3D computer software in Steps 1 and 2. The creative elements are created and animated using the computer and the 3D computer software, Steps 3 and 4. Steps 3 and 4, including animating creative content such as fish swimming around as well as coral moving in the stream is normal 3D animation commonly done for TV and film. However, Steps 5 and 6 describe the interaction between all these animated objects and the exact replica of the surface as was gathered in Steps 1 and 2. When the virtual surface is projected onto itself including the created shadows, a 3D illusion of "fish" or other 3D creative elements is created seemingly suspended above the bottom of the pool. Plant life will seem to grow from the bottom; with the technique of "projecting the pool on itself" it is possible to give the impression of crumbling walls as well as objects coming out of the holes. With shadows, a director can give the impression of an object being above the bottom of the pool, right on the floor or wall surface as well as below in the case of a hole or a "window." To ensure the "fish" do not seem to swim on their side but erect, it is necessary to render the picture from the same angle as where the viewers will be viewing (Step 7 or 8, depending on the viewing angle of the audience). In the case of Step 7, where the viewing area is 360 degrees around the pool, the angle will be from the top and will look natural to the viewer seeing fish from the top if the "fish" are designed to be close to the bottom of the pool. To achieve the viewing angle in the real world as described in steps 7 and 8, one would normally need to place the projector exactly where one rendered it from, in the Sheraton Waikiki Hotel case, from the middle of the audience, or directly above the pool. Both of these may not be practical at a real pool and this is where the real magic happens.

Steps 9 & 10 describe the steps to implement forced perspective to the projected image; the picture is stretched and warped to the correct perspective for the viewer position, but calculated from the projectors physical position. When the picture is viewed from the physical projector position it will be distorted, but viewed from the viewers position it will have the correct perspective. Step 11 is a similar concept except for the fact the lens is a fisheye or very wide lens and below the waterline.

Steps 12 and 13 are the installation of the physical projector on the actual site in the positions as described in Steps 9-11. Steps 14 to 18 are steps to active the experience.

The data gathered and the ability to produce a virtual replica of the real thing is the foundation of being able to project an image onto itself. Augmenting the surface and then adding virtual elements projected in a pool or other body of liquid with shadows further enhances the experience. The key is to be able to warp and force the perspective to be correct for one vantage point but emanating from a different position. Following the above list of steps and ensuring the surface is an actor in the presentation allows shadow to be cast on the geometry and falling on the walls and the bottom of the pool. Camera mapping the image from the viewer position and recording it from the actual installed position to produce a forced perspective planar image to be projected is a key feature of systems, methods, kits, and computer-readable memory of this disclosure. Producing an augmented experience in a swimming pool or other body of liquid necessitates shadows and light to mimic in the real world to produce 3D perception without 3D glasses. Being able to install one or more projectors onto a nearby convenient structure and having it out of sight from the viewers further "sells" the magic. By following the methods described herein, the augmentation will look authentic due to the refraction of the water (or other liquid) and the perspective towards the viewer.

This systems and methods of this disclosure could be used in systems such as a projector and housing with a fitted wide lens to be permanently installed in a swimming pool instead of a light, or systems including a housing and projector assembly permanently or temporarily installed on a structure near the pool. In other embodiments, a screen could be attached to the back of a glass aquarium producing deep backgrounds and additional virtual fish in the aquarium.

Other equipment that might be useful in systems, kits, methods, and computer-readable media of the present disclosure include the media block known under the trade designation QUBE XI™ Integrated Media Block (IMB), from Qube Cinema; CINESTORE SOLO G3™ digital cinema server, available from Barco, Inc. Rancho Cordova, Calif., and other servers currently able to run digital computer operating systems known under the trade designations MICROSOFT® WINDOWS®, APPLE® OS X™, and LINUX®.

Digital Cinema Projectors

At present, only four manufacturers make DCI-approved digital cinema projectors; these are Sony, Barco, Christie Digital Systems (Christie), and NEC. Except for Sony, who use their own SXRD® technology, all use the Digital Light Processing technology developed by Texas Instruments (TI). Although D-Cinema projectors are similar in principle to digital projectors used in industry, education and domestic "home cinemas" they differ in two important respects: firstly they must conform to the strict performance requirements of the DCI specification, secondly they must incorporate anti-piracy devices intended to protect the content copyright. For these reasons all projectors intended to be sold to theaters for screening current release movies must be approved by the DCI before being put on sale. They now pass through a process called CTP (Compliance Test Plan). Because feature films in digital form are encrypted and the decryption keys (KDM'S) are locked to the serial number of the server used (linking to both the projector serial number and server is planned in the future) a system will only allow playback of a protected feature with the required KDM. Without the KDM no playback is possible.

DLP® Cinema Projectors

Three manufacturers have licensed the DLP® cinema technology developed by TI: Christie, Barco, and NEC. DCI-compliant DLP projectors are available in 2K and, as of 2012, 4K, when TI's DLP chip went into full production. Manufacturers of DLP-based cinema projectors can now also offer 4K upgrades to some of the more recent 2K models. Early DLP Cinema Projectors used limited 1280× 1024 resolution or the equivalent of 1.3 MP (megapixels). 2K digital projectors may be used for pre-show advertising, or in lobbies of movie theaters, but are not preferred for feature presentations.

TI's technology is based on the use of Digital Micromirror Devices (DMDs). These devices are manufactured from silicon using similar technology to that of computer memory chips. The surface of these devices is covered by a very large number of microscopic mirrors, one for each pixel, so a 2K device has about 2.2 million mirrors and a 4K device about 8.8 million. Each mirror vibrates several thousand times a second between two positions: in one position, light from the projector's lamp is reflected toward the screen, in the other position light from the projector's lamp is reflected away from it. The proportion of the time the mirror is in each position varies according to the required brightness of each pixel. Three DMD devices are used, one for each of the primary colors. Light from the lamp, usually a Xenon similar to those used in film projectors with a power between 1 kW and 7 kW, is split by colored filters into red, green and blue beams which are directed at the appropriate DMD. The "forward" reflected beam from the three DMDs is then re-combined and focused by the lens onto the cinema screen.

Sony® SXRD® Projectors

Alone amongst the manufacturers of DCI-compliant cinema projectors Sony decided to develop its own technology rather than use TI's DLP® technology. As of 2014, SXRD® projectors have only ever been manufactured in 4K form and, until the launch of the 4K DLP® chip by TI, Sony SXRD® projectors were the only 4K DCI-compatible projectors on the market. Unlike DLP® projectors, however, SXRD® projectors do not present the left and right eye images of stereoscopic movies sequentially but use half the available area on the SXRDt chip for each eye image. Thus during stereoscopic presentations the SXRD® projector functions as a sub 2K projector, the same for HFR 3D Content.

Those having ordinary skill in this art will appreciate, after having read the present disclosure, that there are many possible variations of the methods, systems, kits, and computer-readable media of the present disclosure, and will be able to devise alternatives and improvements to those described herein that are nevertheless considered to be within the claims of the present patent.

What is claimed is:

1. A method comprising:
   a) selecting a body of liquid for projecting images through, the body of liquid contained within a surface defining a resort swimming pool or a hotel swimming pool;
   b) gathering measurements of the body of liquid and the surface defining the resort swimming pool or the hotel swimming pool;
   c) creating a digital virtual 3D model of the body of liquid and the surface defining the resort swimming pool or the hotel swimming pool by loading the measurements into a memory of a digital computer, the computer including at least one processor programmed by computer software sufficient to create virtual 3D images of the body of liquid and the surface defining the resort swimming pool or the hotel swimming pool;
   d) creating digital virtual 3D models of creative elements to be used in one or more scenes using the at least one processor programmed by computer software sufficient to create the digital virtual 3D models of the creative elements;
   e) digitally animating the digital virtual 3D models of the creative elements using the at least one processor programmed by computer software sufficient to digitally animate the digital virtual 3D models of the creative elements;
   f) placing the digitally animated digital virtual 3D modeled creative elements inside the digital virtual 3D model of the body of liquid using the at least one processor programmed by computer software sufficient to place the digitally animated digital virtual 3D modeled creative elements inside the digital virtual 3D model of the body of liquid, using the digital virtual 3D model of the body of liquid and surface to virtually place the digitally animated digital virtual 3D modeled creative elements inside the digital virtual 3D model of the body of liquid and cast shadows onto the digital virtual 3D model of the surface defining the resort swimming pool or the hotel swimming pool;
   g) lighting the animated digital virtual 3D modeled creative elements using the at least one processor programmed with one or more virtual 3D lighting programs to create the cast shadows;
   h) creating digitally rendered planar animations of the lighted, animated digital virtual 3D modeled creative elements using the at least one processor programmed by digital rendering software;
   i) using the at least one processor programmed by digital projection software, virtually projecting the digitally rendered planar animations back onto the digital virtual 3D model of the surface defining the resort swimming pool or the hotel swimming pool of an empty digital virtual 3D model of the body of liquid from the same virtual camera position as in the previous step, thereby electronically baking forced perspective images of the digitally rendered planar animations onto the digital virtual 3D model of the surface defining the resort swimming pool or the hotel swimming pool; and
   j) using the at least one processor programmed by digital rendering software, digitally rendering a 3D animation of the electronically baked forced perspective images of the digitally rendered planar animations from a virtual position that is at the same angle and position as a planned angle and location of a digital physical projector to be installed at a site of the body of liquid.

2. The method of claim 1 further comprising:
  k) playing and/or looping the digitally rendered 3D animation on a digital video player or digital server at the site and projecting the digitally rendered 3D animation from the digital physical projector installed on a structure above or to one side of the body of liquid in the planned angle and location as the virtual position.

3. The method of claim 1 wherein the gathering of measurements is by a method selected from the group consisting of by hand, from CAD drawings, from blueprints, using a laser scanner, and combinations of two or more of these.

4. The method of claim 1 wherein the creating of digitally rendered planar animations of the lighted, animated digital virtual 3D modeled creative elements comprises:
  A) digitally rendering the lighted, animated digital virtual 3D modeled creative elements from a digital virtual camera directly above the virtual body of liquid in the digital 3D virtual model if the body of liquid and surface defining the resort swimming pool or the hotel swimming pool are located in the center of a viewing area; or
  B) digitally rendering the lighted, animated digital virtual 3D modeled creative elements from a digital virtual camera located at a center of a side vantage point in the digital 3D virtual model if the body of liquid and surface defining the resort swimming pool or the hotel swimming pool are to be viewed from one side only.

5. The method of claim 1 wherein the digitally rendering of the 3D animation of the electronically baked forced perspective images of the digitally rendered planar animations comprises:
  A) in the case of an internal installed projector, digitally rendering the animations from the same angle as the internal installed projector using a spherical, fisheye or mirrored lens; or
  B) in the case of an internal (existing light replacement) projector, replacing the glass lens with a manufactured bubble lens to accommodate a wide, fisheye or mirror lens.

6. The method of claim 1 wherein the body of liquid comprises one or more features selected from the group consisting of a reflecting pool and a fountain.

7. The method of claim 1 wherein the computer software sufficient to create virtual 3D images, to create the digital virtual 3D models of the creative elements, digitally animate creative elements, place the digitally animated creative elements inside the digital virtual 3D model of the body of liquid, and the one or more virtual 3D lighting programs includes one or more:
  i) options for 3D unwrapping, texturing, shading, physics, dynamics and particles, real time 3D/game creation, camera projection shading, 2D and 3D procedural brushes, edge rendering, and/or collision simulation;
  ii) integration software built into the program, allowing seamless integration of 3D scenes into the digital rendering and projection software;
  iii) allows changes to the 3D animation to automatically be updated inside of the digital rendering and projection comsoftware; and
  iv) a software toolset enabling creation of flying logos and similar simple effects.

8. The method of claim 1 wherein the digital rendering and projection software is selected from software that allows changes to the 3D animation to automatically be updated inside of the digital rendering and projection software.

9. A method comprising:
  a) selecting a resort swimming pool or hotel swimming pool for projecting images through, the resort swimming pool or the hotel swimming pool contained within a surface defining the resort swimming pool or the hotel swimming pool;
  b) gathering exact measurements of an outer rim as well as the inside surface area of the resort swimming pool or the hotel swimming pool by hand or from CAD drawings, blueprints or a laser scanner;
  c) creating a digital virtual 3D model of the resort swimming pool or the hotel swimming pool and the surface defining the resort swimming pool or the hotel swimming pool by loading the measurements into a memory of a digital computer, the computer including at least one processor programmed by computer software sufficient to make the digital virtual 3D images of the resort swimming pool or the hotel swimming pool contained within the surface defining the resort swimming pool or the hotel swimming pool;
  d) creating digital virtual 3D models of creative elements to be used in one or more scenes using the digital computer and the computer software;
  e) animating the digital virtual 3D models making sure that moveable creative elements (for example, human characters and non-human creatures) travel within the digital virtual 3D model of the resort swimming pool or the hotel swimming pool contained within a surface defining the resort swimming pool or the hotel swimming pool;
  f) placing the animated digital virtual 3D modeled creative elements inside the digital virtual 3D model of the resort swimming pool or the hotel swimming pool using the digital virtual 3D model of the resort swimming pool or the hotel swimming pool and the surface defining the resort swimming pool or the hotel swimming pool to virtually place the digitally animated digital virtual 3D modeled creative elements inside the digital virtual 3D model of the resort swimming pool or the hotel swimming pool and cast shadows onto the digital virtual 3D model of the surface defining the resort swimming pool or the hotel swimming pool;
  g) lighting the animated digital virtual 3D modeled creative elements using the programmed digital computer programmed with one or more digital virtual 3D lighting programs in such a way to cast the shadows of the animated digital virtual 3D modeled creative elements on the digital virtual 3D model of the surface defining the resort swimming pool or the hotel swimming pool, causing enhanced 3D augmentation in the resort swimming pool or the hotel swimming pool when the animation is played therein;
  h) creating digital rendered planar animations of the lighted, animated digital virtual 3D modeled creative elements and/or stills by:
    A) rendering the lighted, animated digital virtual 3D modeled creative elements and/or stills from a virtual camera directly above the virtual resort swimming pool or the hotel swimming pool in the 3D virtual model if the resort swimming pool or the hotel swimming pool and the surface defining the resort swimming pool or the hotel swimming pool are located in the center of a viewing area; or
    B) rendering the lighted, animated digital virtual 3D modeled creative elements and/or stills from a virtual camera located at a center of a side vantage point in the 3D virtual model if the resort swimming pool or the hotel swimming pool and surface defining the resort swimming pool or the hotel swimming pool are to be viewed from one side only;

i) using the programmed digital computer, virtually projecting the digital rendered planar animations back onto the digital virtual 3D model of the surface defining the resort swimming pool or the hotel swimming pool of an empty digital virtual 3D model of the resort swimming pool or the hotel swimming pool from the same virtual camera position as in the previous step, thereby electronically baking forced perspective images of the digital rendered planar animations onto the digital virtual 3D model of the surface defining the resort swimming pool or the hotel swimming pool;

j) digitally rendering a 3D animation of the electronically baked forced perspective images of the digital rendered planar animations from a virtual position that is at the same angle and position as a planned angle and location of a digital physical projector to be installed at a site of the resort swimming pool or the hotel swimming pool; and k) at the site, installing the digital physical projector as planned on a structure above or to one side of the resort swimming pool or the hotel swimming pool in the same position as the virtual position, connecting the digital physical projector to a video player or server capable of playing digital and video images, loading the digitally rendering a 3D animation into the video player or server, waiting until the sun sets or reasonable darkness if the resort swimming pool or the hotel swimming pool is outdoors, focusing the digital physical projector and lining up the digital virtual 3D model of the resort swimming pool or the hotel swimming pool with the resort swimming pool or the hotel swimming pool while projecting the digital virtual 3D model of the resort swimming pool or the hotel swimming pool onto the surface defining the resort swimming pool or the hotel swimming pool and containing the resort swimming pool or the hotel swimming pool, and playing and/or looping the digitally rendering a 3D animation.

10. The method of claim 9 wherein the computer software sufficient to create virtual 3D images, to create the digital virtual 3D models of the creative elements, digitally animate creative elements, place the digitally animated creative elements inside the digital virtual 3D model of the of the resort swimming pool or the hotel swimming pool, and the one or more virtual 3D lighting programs includes one or more:

i) options for 3D unwrapping, texturing, shading, physics, dynamics and particles, real time 3D/game creation, camera projection shading, 2D and 3D procedural brushes, edge rendering, and/or collision simulation;

ii) integration software built into the program, allowing seamless integration of 3D scenes into the digital rendering projection software;

iii) allows changes to the 3D animation to automatically be updated inside of the digital rendering and projection software; and iv) a software toolset enabling creation of flying logos and similar simple effects.

11. The method of claim 9 wherein the digital rendering and projection software is selected from software that allows changes to the 3D animation to automatically be updated inside of the digital rendering and projection software.

12. A system comprising:

a) a digital computer, the digital computer including a memory and at least one processor programmed by computer software sufficient to make digital virtual 3D images of a resort swimming pool or the hotel swimming pool and a surface containing the resort swimming pool or the hotel swimming pool, b) the memory sufficient to hold measurements of the resort swimming pool or the hotel swimming pool and the surface defining the resort swimming pool or the hotel swimming pool, the at least one processor programmed by computer software sufficient to:

create digital virtual 3D models of creative elements;

animate the digital virtual 3D models of the creative elements;

place at least some of the animated digital virtual 3D modeled creative elements inside the digital virtual 3D image of the resort swimming pool or the hotel swimming pool using the digital virtual 3D images of the resort swimming pool or the hotel swimming pool and the surface defining the resort swimming pool or the hotel swimming pool to place the at least some of the animated digital virtual 3D modeled creative elements into the digital virtual 3D image of the resort swimming pool or the hotel swimming pool and cast shadows onto the digital virtual 3D image of the surface defining the resort swimming pool or the hotel swimming pool;

light at least some of the animated digital virtual 3D modeled creative elements with one or more virtual 3D lighting programs to create the cast shadows;

create digitally rendered planar animations of the lighted, animated digital virtual 3D modeled creative elements;

virtually project the digitally rendered planar animations back onto the digital virtual 3D image of the surface defining the resort swimming pool or the hotel swimming pool of an empty digital virtual 3D image of the resort swimming pool or the hotel swimming pool from the same virtual camera position as in the previous step, thereby electronically baking forced perspective images of the digitally rendered planar animations onto the digital virtual 3D image of the surface defining the resort swimming pool or the hotel swimming pool; and digitally render a 3D animation of the electronically baked forced perspective images of the digitally rendered planar animations from a virtual position that is at the same angle and position as a planned angle and location of a digital physical projector to be installed at a site of the resort swimming pool or the hotel swimming pool.

13. The system of claim 12 further comprising a digital video player or digital server computer, and one or more digital physical projectors, the digital video player or the digital server computer configured sufficiently to play and/or loop the 3D animation, the one or more digital physical projectors installed on a structure above or to one side of the resort swimming pool or the hotel swimming pool in the planned angle and location as the virtual position, the one or more digital physical projectors configured to project at least a portion of the digitally rendered 3D animation through the resort swimming pool or the hotel swimming pool and onto the surface defining the resort swimming pool or the hotel swimming pool, completing an illusion of at least some of the creative elements in the resort swimming pool or the hotel swimming pool.

14. The system of claim 12 wherein the resort swimming pool or the hotel swimming pool comprises a feature selected from the group consisting of a reflecting pool and a fountain.

15. The system of claim 13 wherein the one or more digital physical projectors transmit an image at a resolution, represented by horizontal pixel count, of at least 2K (2048× 1080 or 2.2 megapixels).

16. The system of claim 15 wherein the one or more digital projectors are selected from the group consisting of DLP and laser cinema projectors.

17. The system of claim 13 wherein the server computer supports JPEG2000 and MPEG2 files, and dual-projector 3D playback.

18. The system of claim 12 wherein the computer software sufficient to create virtual 3D images, to create the digital virtual 3D models of the creative elements, digitally animate creative elements, place the digitally animated creative elements inside the digital virtual 3D model of the of the resort swimming pool or the hotel swimming pool and the surface defining the resort swimming pool or the hotel swimming pool, and the one or more virtual 3D lighting programs includes one or more:
i) options for 3D unwrapping, texturing, shading, physics, dynamics and particles, real time 3D/game creation, camera projection shading, 2D and 3D procedural brushes, edge rendering, and/or collision simulation;
ii) integration software built into the program, allowing seamless integration of 3D scenes into the digital rendering and projection software;
iii) allows changes to the 3D animation to automatically be updated inside of the digital rendering and projection software; and
iv) a software toolset enabling creation of flying logos and similar simple effects.

19. The system of claim 12 wherein the digital rendering and projection software is selected from software that allows changes to the 3D animation to automatically be updated inside of the digital rendering and projection software.

20. A system comprising:
a) a resort swimming pool or the hotel swimming pool contained within a surface defining the resort swimming pool or the hotel swimming pool;
b) a digital computer, the digital computer including a memory and at least one processor programmed by computer software sufficient to make virtual 3D images of the resort swimming pool or the hotel swimming pool and the surface defining the resort swimming pool or the hotel swimming pool, the memory sufficient to hold measurements of the resort swimming pool or the hotel swimming pool and surface defining the resort swimming pool or the hotel swimming pool;
c) the at least one processor programmed by computer software sufficient to create digital virtual 3D models of creative elements to be used in one or more scenes using the computer and the computer software;
d) the at least one processor programmed by computer software sufficient to animate the digital virtual 3D models of the creative elements;
e) the at least one processor programmed by computer software sufficient to place at least some of the animated digital virtual 3D modeled creative elements inside the digital virtual 3D image of the resort swimming pool or the hotel swimming pool using the digital virtual 3D image of the resort swimming pool or the hotel swimming pool and the surface defining the resort swimming pool or the hotel swimming pool to place objects inside the digital virtual 3D image of the resort swimming pool or the hotel swimming pool and cast shadows onto the digital virtual 3D image of the surface defining the resort swimming pool or the hotel swimming pool;
f) the at least one processor programmed by computer software sufficient to light the animated digital virtual 3D modeled creative elements with one or more virtual 3D lighting programs to create the cast shadows;
g) the at least one processor programmed by computer software sufficient to create digitally rendered planar animations of the lighted, animated digital virtual 3D modeled creative elements;
h) the at least one processor programmed by computer software sufficient to virtually project the digitally rendered planar animations back onto the digital virtual 3D image of the surface defining the resort swimming pool or the hotel swimming pool of an empty virtual 3D image of the resort swimming pool or the hotel swimming pool from the same virtual camera position as in the previous step, thereby electronically baking forced perspective images of the digitally rendered planar animations onto the digital virtual 3D image of the surface defining the resort swimming pool or the hotel swimming pool;
i) the at least one processor programmed by computer software sufficient to digitally render a 3D animation of the electronically baked forced perspective images of the virtually projected rendered planar animations from a virtual position that is at the same angle and position as a planned angle and location of a digital physical projector to be installed at a site of the resort swimming pool or the hotel swimming pool and the surface defining the resort swimming pool or the hotel swimming pool;
j) a digital video player or digital server computer sufficient to play and/or loop the 3D animation; and
k) one or more digital physical projectors installed on a structure above or to one side of the resort swimming pool or the hotel swimming pool and the surface defining resort swimming pool or the hotel swimming pool in the planned angle and location as the virtual position, the one or more digital physical projectors sufficient to project the digitally rendered 3D animation of the electronically baked forced perspective images of the virtually projected rendered planar animations through the resort swimming pool or the hotel swimming pool and onto the surface defining the resort swimming pool or the hotel swimming pool, completing an illusion of at least some of the lighted, animated digital virtual 3D modeled creative elements in the resort swimming pool or the hotel swimming pool.

21. The method of claim 1 comprising virtually texturing the digitally rendered planar animations using the at least one processor programmed by digital projection and texturing software.

22. The method of claim 9 comprising virtually texturing the digitally rendered planar animations using the at least one processor programmed by digital projection and texturing software.

23. The system of claim 12 wherein the at least one processor programmed by computer software is sufficient to virtually texture the digitally rendered planar animations.

24. The system of claim 20 wherein the at least one processor programmed by computer software is sufficient to virtually texture the digitally rendered planar animations.

* * * * *